(12) United States Patent
Lee et al.

(10) Patent No.: US 11,853,544 B2
(45) Date of Patent: Dec. 26, 2023

(54) ELECTRONIC DEVICE, METHOD FOR DRIVING ELECTRONIC DEVICE, AND METHOD FOR CONTROLLING DATA RECORDING APPLICATION

(71) Applicant: NEOLAB CONVERGENCE INC., Seoul (KR)

(72) Inventors: Sang Gyu Lee, Seoul (KR); Suk Joo Lee, Yongin-si (KR)

(73) Assignee: NEOLAB CONVERGENCE INC., Seoul (KR)

( * ) Notice: Subject to any disclaimer, the term of this patent is extended or adjusted under 35 U.S.C. 154(b) by 0 days.

(21) Appl. No.: 17/882,062

(22) Filed: Aug. 5, 2022

(65) Prior Publication Data

US 2023/0065634 A1 Mar. 2, 2023

Related U.S. Application Data

(63) Continuation of application No. 16/954,118, filed as application No. PCT/KR2018/014095 on Nov. 16, 2018, now abandoned.

(30) Foreign Application Priority Data

Dec. 28, 2017 (KR) .................. 10-2017-0182503

(51) Int. Cl.
*G06F 3/04883* (2022.01)
*G06F 3/00* (2006.01)
(Continued)

(52) U.S. Cl.
CPC .......... *G06F 3/04883* (2013.01); *G06F 3/005* (2013.01); *G06F 3/0383* (2013.01);
(Continued)

(58) Field of Classification Search
CPC ....... G06F 3/0488–04886; G06F 3/005; G06F 3/03545; G06F 3/0383; G06F 3/0482;
(Continued)

(56) References Cited

U.S. PATENT DOCUMENTS 6,188,392 B1 2/2001 O'Connor et al.
9,462,017 B1* 10/2016 Siracusano, Jr. ... H04L 65/4015
(Continued)

FOREIGN PATENT DOCUMENTS

JP 2010-244391 10/2010
JP 2015-533004 11/2015
(Continued)

OTHER PUBLICATIONS

KR Office Action dated Mar. 12, 2018 as received in Application No. 10-2017-0182503.
(Continued)

*Primary Examiner* — David Tung
(74) *Attorney, Agent, or Firm* — Maschoff Brennan

(57) ABSTRACT

One embodiment of the present invention relates to an electronic device for reproducing, in time sequence, first pen data in which handwriting strokes are digitized on a medium by an electronic pen. The electronic device comprises: a communication module; a control module; an output module for reproducing or outputting first handwriting information, first image or audio information photographed or recorded by the electronic device, and event information in time sequence; and a memory module for storing contents including the first handwriting information, the first image or audio information, and the event information, wherein, when the communication module further receives second pen data in a state where the first handwriting information is held on the output module after the contents are stored in the memory module, second handwriting information corresponding to (Continued)

the second pen data is added to the first handwriting information and then reproduced.

9 Claims, 30 Drawing Sheets

(51) Int. Cl.
  *G06F 3/0354* (2013.01)
  *G06F 3/038* (2013.01)
  *G06F 3/0482* (2013.01)
  *G06V 10/10* (2022.01)
(52) U.S. Cl.
  CPC ........ *G06F 3/03545* (2013.01); *G06F 3/0482* (2013.01); *G06V 10/10* (2022.01)
(58) Field of Classification Search
  CPC .......... G06F 3/0321; G06F 3/038; G06F 3/16; G06F 2203/04803; G06K 9/20; G06V 10/10
  See application file for complete search history.

(56) References Cited

U.S. PATENT DOCUMENTS

| | | | |
|---|---|---|---|
| 2004/0237033 A1 | 11/2004 | Woolf | |
| 2005/0219226 A1 | 10/2005 | Liu | |
| 2006/0041632 A1 | 2/2006 | Shah | |
| 2008/0229186 A1 | 9/2008 | Gear | |
| 2010/0070878 A1 | 3/2010 | Amento | |
| 2011/0154192 A1* | 6/2011 | Yang | G06F 40/171 715/256 |
| 2011/0181683 A1* | 7/2011 | Nam | H04N 21/485 348/E7.078 |
| 2012/0263381 A1 | 10/2012 | Yoshida | |
| 2014/0118314 A1* | 5/2014 | Black | G06F 3/04842 345/179 |
| 2014/0118315 A1 | 5/2014 | Black | |
| 2014/0164852 A1* | 6/2014 | Sumiyoshi | H04L 43/045 714/57 |
| 2014/0380193 A1* | 12/2014 | Coplen | G06F 3/04847 715/753 |
| 2015/0082204 A1* | 3/2015 | Li | H04N 21/632 715/756 |
| 2015/0339050 A1* | 11/2015 | Vong | G06T 11/60 345/173 |
| 2016/0330404 A1* | 11/2016 | Nelson | H04M 7/0027 |
| 2016/0373693 A1* | 12/2016 | Segal | H04N 21/47 |
| 2017/0278549 A1* | 9/2017 | Tamura | G11B 27/036 |

FOREIGN PATENT DOCUMENTS

| | | |
|---|---|---|
| JP | 2017-175419 | 9/2017 |
| KR | 10-2007-0050899 A | 5/2007 |
| KR | 10-2011-0099971 A | 9/2011 |
| KR | 10-2016-0045535 A | 4/2016 |
| KR | 10-2017-0098617 A | 8/2017 |
| WO | 2008-133411 A1 | 11/2008 |
| WO | 2014-33848 | 3/2014 |
| WO | 2017-10469 | 1/2017 |

OTHER PUBLICATIONS

Office Action of JP Patent Application No. 2020-531709, Sep. 7, 2021.

* cited by examiner

FIG. 2
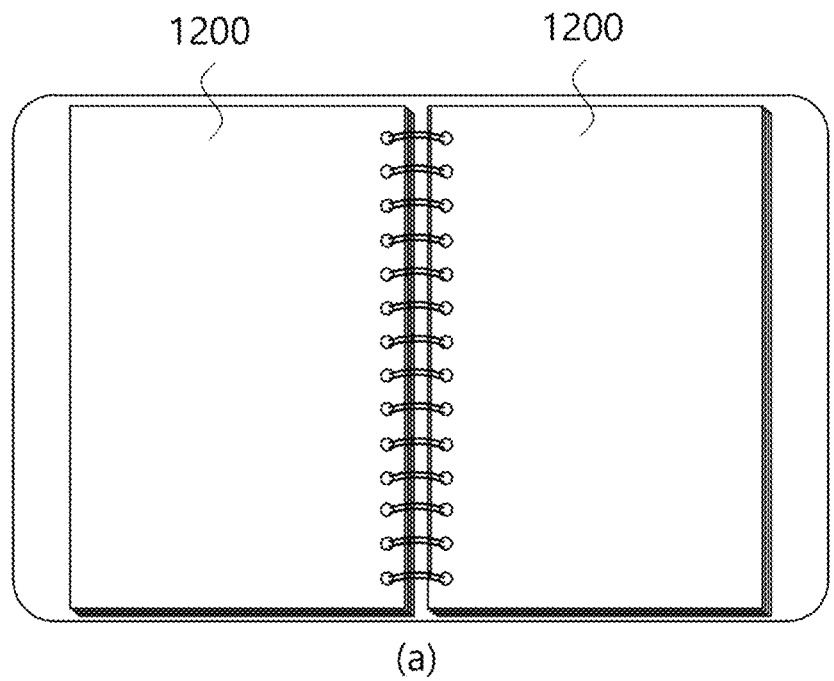
(a)
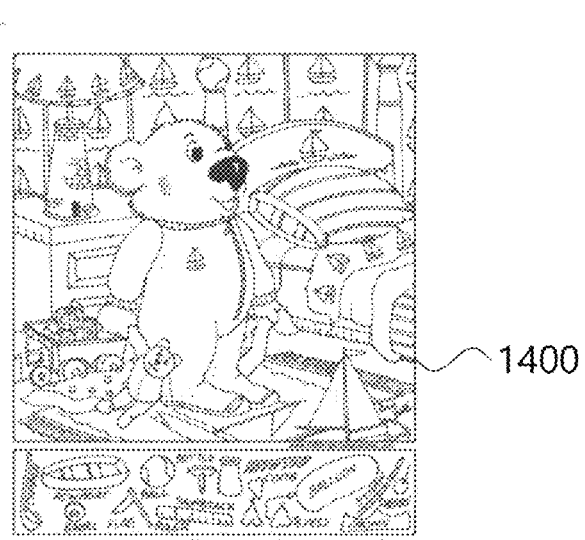
(b)

FIG. 25

ELECTRONIC DEVICE, METHOD FOR DRIVING ELECTRONIC DEVICE, AND METHOD FOR CONTROLLING DATA RECORDING APPLICATION

TECHNICAL FIELD

The present invention relates to an electronic device, a method of driving an electronic device, and a method of controlling a data recording application, and more particularly, to a method of creating contents including handwriting information written with an electronic pen and user-associated image information and voice information.

BACKGROUND ART

In recent years, technology and products for recognizing a user's handwriting using an electronic pen and digitizing and storing a handwritten note have been commercialized. However, a method of providing a user with a handwritten note that is recognized using such an electronic pen and digitized in a meaningful way has not been satisfactorily developed. Accordingly, there is a need to develop methods of enabling users to effectively utilize digitized notes.

In particular, there have been attempts to produce lecture materials including videos using an electronic pen, but most of the attempts are still performed on a computer that provides a touch screen. Contents produced by handwriting directly on a computer causes users who are still accustomed to using paper to feel tired of creating contents on a digital device and is difficult to provide to a user who wants to preserve original contents created through hard copy.

DISCLOSURE

Technical Problem

An objective of the present invention is to provide an electronic device and a data recording application which enable efficient and easy creation of contents a user wants to produce.

Technical Solution

According to an aspect of the present invention, there is provided an electronic device for reproducing, in time sequence, first pen data obtained by digitizing a handwriting trajectory created on a medium with an electronic pen, the electronic device including a communication module configured to receive the first pen data; a control module configured to convert the first pen data into first handwriting information; an output module configured to reproduce or output, in time sequence, the first handwriting information, first image information or first audio information captured or recorded by the electronic device, and event information of a menu selected from a menu medium; and a memory module configured to store contents including the first handwriting information, the first image or audio information, and the event information, wherein when the communication module additionally receives second pen data created on the medium while the first handwriting information is held on the output module, second handwriting information corresponding to the second pen data is reproduced in addition to the first handwriting information after the contents are stored in the memory module.

According to another embodiment of the present invention, there is provided a method of driving an electronic device for reproducing and storing pen data obtained by digitizing a handwriting trajectory created on a medium with an electronic pen, the method including displaying an image of the medium on the electronic device; reproducing or outputting, in time sequence, handwriting information corresponding to the pen data, a user's image information and audio information input to an input module of the electronic device, and event information of a menu selected from a menu medium; selectively displaying an entire region or a partial region of the image of the medium on the electronic device; and in the case of only the partial region displayed on the electronic device, shifting the medium image to a region other than the partial region to reproduce the handwriting information when the electronic device determines that the handwriting trajectory created on the medium cannot be reproduced in the partial region.

According to another aspect of the present invention, there is provided a method of controlling a data recording application for recording and storing contents such that a handwriting trajectory created with an electronic pen is reproduced in time sequence, the method including displaying an image of a medium on which the handwriting trajectory is to be created on a display of an electronic device; placing or outputting, in time sequence, handwriting information obtained by converting the handwriting trajectory created on the medium, image or audio information captured or recorded by the electronic device, and event information of a menu selected from a menu medium; and replaying at least one of an image file or an audio file stored in the electronic device and an image file or an audio file of a website together with the contents.

Advantageous Effects

According to the present invention, it is possible to increase the convenience of a producer and improve the functionality of contents production when producing contents for lecture or explanation.

According to the present invention, it is possible to improve the updating of contents by performing production through addition of new contents to pre-stored contents after the contents are stored.

According to the present invention, by producing contents in a document including graphic information such as letters or pictures, it is possible to improve the efficiency of contents production compared to when contents are produced in a blank state.

According to the present invention, by controlling an electronic device, changing the appearance of handwriting, or adding an exciting event, it is possible to improve the convenience and pleasure of contents production when producing contents.

According to the present invention, handwriting information can be edited while contents production is stopped, and thus it is possible to improve user convenience.

According to the present invention, after information regarding contents are automatically recognized and extracted, tag information may be generated or the information may be stored as contents, and thus it is possible to enhance a search function.

DESCRIPTION OF DRAWINGS

FIG. 2 is a diagram showing a medium associated with embodiments of the present invention.

FIGS. 22 to 26 are screens illustrating progression of the data recording application after selecting a graphic medium.

BEST MODE FOR CARRYING OUT THE INVENTION

Figure 1:
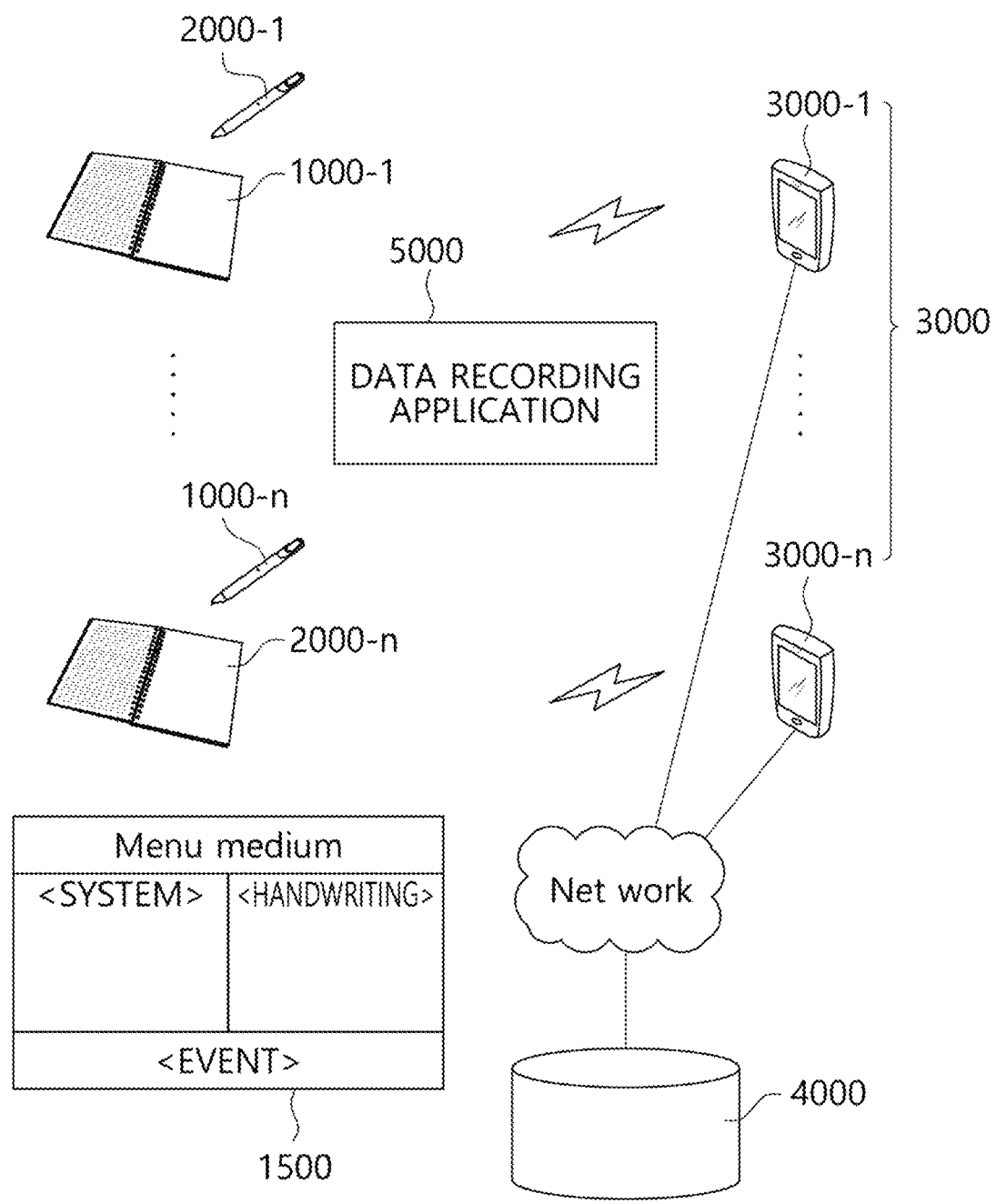
FIG. 1 is a schematic diagram illustrating a system including an electronic pen, an electronic device interoperating with the electronic pen, etc. which are associated with embodiments of the present invention.

Embodiments described in this specification are made to clearly explain the scope of the invention to those having ordinary skill in the art and are not intended to limit the present invention. It should be interpreted that the present invention may include substitutions and modifications within the technical scope of the present invention.

The terms used in this specification are selected from general terms, which are currently widely used, based on functions of the present invention and may have meanings varying according to the intentions of those skilled in the art, the custom in the field of art, or advance of new technology. If a specific term is used with a specific meaning, the meaning of the term will be described specifically. Accordingly, the terms used in this specification should not be defined as simple names of the components, but should be defined based on the actual meaning of the terms and the whole context throughout the present specification.

The accompanying drawings are to facilitate the explanation of the present invention, and the shape in the drawings may be exaggerated for the purpose of convenience of explanation, so the present invention should not be limited to the drawings.

In addition, the details of the generally known function and structure, which make the subject matter of the present invention unclear, will be omitted.

An electronic device interoperating with an electronic pen described herein may include a mobile terminal, such as a cellular phone, a smartphone, a laptop computer, a digital broadcasting terminal, a personal digital assistant (PDA), a portable multimedia player (PMP), and a navigation device, and also a stationary terminal, such as a digital TV and a desktop computer.

According to an aspect of the present invention, there is provided an electronic device for reproducing, in time sequence, first pen data obtained by digitizing a handwriting trajectory created on a medium with an electronic pen, the electronic device including a communication module configured to receive the first pen data; a control module configured to convert the first pen data into first handwriting information; an output module configured to reproduce or output, in time sequence, the first handwriting information, first image or audio information captured or recorded by the electronic device, and event information of a menu selected from a menu medium; and a memory module configured to store contents including the first handwriting information, the first image or audio information, and the event information, wherein when the communication module additionally receives second pen data created on the medium while the first handwriting information is held on the output module, second handwriting information corresponding to the second pen data is reproduced in addition to the first handwriting information after the contents are stored in the memory module.

The output module may include a display or a speaker.

The medium may include a pattern code to be detected by the electronic pen, and the communication module may receive the first pen data or the second pen data obtained by digitizing the pattern code detected by the electronic pen.

The medium may include a blank medium or a graphic medium, and each of the blank medium and the graphic medium may include a pattern code to be detected by the electronic pen.

The control module may perform control such that a file stored in the memory module is converted into a graphic medium file and such that the graphic medium file is printed in the graphic medium.

The graphic medium file may be output to the output module as a graphic medium image, and the graphic medium image may include a mark for calibration with the medium.

The graphic medium may be the blank medium on which the graphic medium file is printed.

An image of one of the blank medium and the graphic medium may be output to the output module such that the contents are reproduced.

The menu medium may include a system menu, a handwriting menu, or an event menu.

The menu medium may include a plurality of menus, and each menu may have a pattern code to be detected by the electronic pen, and when the communication module receives a selection of one of the plurality of menus included in the menu medium, an event of the selected menu may be reproduced on the output module.

The menu medium may include a pause menu, and when the communication module receives an occurrence of a pause event, the first handwriting information or the second handwriting information may be edited while the output of the first image or audio information is stopped.

When the communication module receives a selection of one of a plurality of menus included in the event menu, a visual effect or a sound effect may be provided through the output module.

When the communication module receives a selection of one of a plurality of menus included in the handwriting menu, a stroke included in the first handwriting information or the second handwriting information may have a color or thickness changed when the first pen data or the second pen data is converted into the first handwriting information or the second handwriting information, respectively.

The output module may include a first window for reproducing the first handwriting information or the second handwriting information and a second window for displaying the first image information.

The contents may further include second image or audio information selected from the electronic device.

The output module may include a third window for displaying the second image information.

The second window or the third window may be adjusted in position on the output module.

The first image information may be captured by a camera built in the electronic device.

The camera may include a first camera and a second camera positioned on a front surface and a rear surface of the electronic device, respectively, and the first image information may be selectively captured by one of the first camera and the second camera.

The medium may include a first region and a second region distinct from the first region, and when the first pen data or the second pen data includes position information of a handwriting trajectory created in the first region and the second region, the first handwriting information or the second handwriting information are shifted on the display to correspond to the first region or the second region on the basis of the position information.

According to another aspect of the present invention, There is provided a method of driving an electronic device for reproducing and storing pen data obtained by digitizing a handwriting trajectory created on a medium with an electronic pen, the method including displaying an image of the medium on the electronic device; reproducing or outputting, in time sequence, handwriting information corresponding to the pen data, a user's image information and audio information input to an input module of the electronic device, and event information of a menu selected from a menu medium; selectively displaying an entire region or a partial region of the image of the medium on the electronic device; and in the case of only the partial region displayed on the electronics, shifting the medium image to a region other than the partial region to reproduce the handwriting information when the electronic device determines that the handwriting trajectory created on the medium cannot be reproduced in the partial region.

The medium may include a blank medium or a graphic medium, and an image of one of the blank image and the graphic medium may be displayed on the electronic device.

The blank medium, the graphic medium, or the menu medium may include a pattern code to be detected by the electronic pen, and the communication module may receive the pen data obtained by digitizing the pattern code detected by the electronic pen.

Control may be performed such that a file stored in the electronic device is converted into a graphic medium file and such that the graphic medium file is printed in the graphic medium.

The graphic medium may be the blank medium on which the graphic medium file is printed.

The menu medium may include a system menu, a handwriting menu, or an event menu.

The menu medium may include a plurality of menus, and each menu may have a pattern code to be detected by the electronic pen, and when the communication module receives a selection of one of the plurality of menus included in the menu medium, an event of the selected menu may be reproduced on the output module.

The menu medium may include a pause menu, and when the communication module receives an occurrence of a pause event, the handwriting information may be edited while the output of the image information and the audio information is stopped.

When the communication module receives a selection of one of a plurality of menus included in the event menu, a visual effect or a sound effect may be provided through the output module.

When the communication module receives a selection of one of a plurality of menus included in the handwriting menu, the color and thickness of a stroke included in handwriting information may be changed when the pen data is converted into the handwriting information.

A first window for reproducing the handwriting information and a second window for displaying the image information may be included.

When an image file or an audio file stored in the electronic device is executed, image information or audio information corresponding to the image file or voice file may be additionally output to the electronic device.

The image information corresponding to the image file may be reproduced in a third window.

The second window or the third window may be adjusted in position on the display of the electronic device.

The image information may be captured by a camera built in the electronic device.

The camera may include a first camera and a second camera positioned on a front surface and a rear surface of the electronic device, respectively, and the image information may be selectively captured by one of the first camera and the second camera.

The image of the graphic medium may be calibrated on the display of the electronic device.

According to another aspect of the present invention, there is provided a method of controlling a data recording application for recording and storing contents such that a handwriting trajectory created with an electronic pen is reproduced in time sequence, the method including displaying an image of a medium on which the handwriting trajectory is to be created on a display of an electronic device; placing or outputting, in time sequence, handwriting information obtained by converting the handwriting trajectory created on the medium, image or audio information captured or recorded by the electronic device, and event information of a menu selected from a menu medium; and replaying at least one of an image file or an audio file stored in the electronic device and an image file or an audio file of a website together with the contents.

The medium may include a blank medium or a graphic medium.

An image of the graphic medium may be a document file that is stored in the electronic device, converted into a graphic medium file, and then displayed on the display.

The blank medium or the graphic medium may include a pattern code to be detected by the electronic pen.

The graphic medium may be produced by the graphic media file being printed on the blank medium.

The graphic medium image may include a mark for calibration with the graphic medium.

The menu medium may include a system menu, a handwriting menu, or an event menu.

The menu medium may include a plurality of menus, and each menu may have a pattern code to be detected by the electronic pen, and when the electronic device detects a selection of one of the plurality of menus included in the menu medium, an event of the selected menu may be reproduced in the output module.

The menu medium may include a pause menu, and when the electronic device detects an occurrence of a pause event, the handwriting information may be edited while the reproduction of the image information or the audio information is stopped.

When the electronic device detects a selection of one of a plurality of menus included in the event menu, a visual effect or a sound effect may be provided through the output module.

When the electronic device detects a selection of one of a plurality of menus included in the handwriting menu, the color or thickness of a stroke included in the handwriting information may be changed.

The handwriting information may be reproduced in a first window of the electronic device, and the image information may be displayed in a second window of the electronic device.

An additionally replayed image file may be displayed in a third window of the electronic device.

The second window or the third window may be adjusted in position on the output module.

The image information may be captured by one of a first camera and a second camera built in a front surface and a rear surface of the electronic device, respectively.

An entire region or a partial region of the image of the medium may be selectively displayed on the electronic device; and when only the partial region is displayed on the electronic device and the electronic device determines that the handwriting trajectory created on the medium cannot be reproduced in the partial region, the medium image may be shifted to a region other than the partial region, and thus the handwriting information may be represented.

<System Configuration>

FIG. 1 is a schematic diagram illustrating a system including an electronic pen, an electronic device interoperating with the electronic pen which are associated with embodiments of the present invention.

The system may include at least one medium 1000, at least one menu medium 1500, at least one electronic pen 2000, at least one electronic device 3000, at least one server 4000, and a data recording application 5000.

The medium 1000 provides a surface for handwriting a note desired by a user with an electronic pen according to embodiments of the present invention.

The medium 1000 may be made of a material such as paper, plastic, and metal, and the material of the medium 1000 according to the present invention is not limited thereto.

When the electronic pen according to embodiments of the present invention is an electronic pen implemented with an optical element including a camera module or the like, the medium 1000 may include a pattern code that may be recognized by the electronic pen. When a pattern code is included in the medium 1000, the pattern code may be provided to the medium 1000 through a method such as printing.

When a note handwritten on the medium 1000 by a user is stored or reproduced on a display of the electronic device, a menu medium 1500 may provide system settings of the electronic device or the data recording application 5000, the color and thickness of a stroke included in the handwritten note, sound effects, or visual effects.

The menu medium 1500 may also be made of a material such as paper, which is the same as that of the above-described medium, but the present invention is not limited thereto. The menu medium 1500 may include a pattern code that may be recognized by the electronic pen. The pattern code may be provided to the menu medium 1500 through a method such as printing.

The electronic pen 2000 may detect information regarding a user's handwriting and generate pen data. The pen data may be used to generate stroke data on the user's handwriting. The electronic device 3000 may receive the pen data from the electronic pen 2000 and interpret the received pen data. The stroke data may be generated on the basis of the interpretation of the pen data.

The electronic device 3000 may properly process the interpreted stroke data to reproduce the user's handwriting in real time or replay the user's handwriting later through a display included in the electronic device 3000, depending on the stroke data.

Also, the electronic device 3000 may store the pen data and/or the stroke data generated on the basis of the interpretation of the pen data in a memory or the like included in the electronic device 3000 and may properly process the pen data and/or the stroke data according to a user's request.

The electronic device 3000 may be connected to the server 4000 over a network to transmit or receive necessary information through the network.

The server 4000 may be connected to the electronic device 3000 over the network to receive or transmit necessary information.

The server 4000 may be connected to a plurality of electronic devices 3000 to build a database of pen data (or stroke data) received from the electronic devices 3000.

The server 4000 may properly process the pen data (or the stroke data) stored in the database upon requests from the plurality of electronic devices 3000 or a user's request.

The server 4000 may perform some or all functions of the electronic devices 3000 that have been described above. For example, the electronic device 3000 may receive the pen data from the electronic pen 2000 and immediately transmit the pen data to the server 4000 without performing a special processing procedure for the pen data. In this case, as described above, the server 4000 may perform an operation of receiving the pen data and generating the stroke data and an operation of storing the stroke data, additionally processing the stroke data.

The data recording application 5000 is an authoring tool that creates lecture materials or produces materials to explain contents to viewers using the electronic pen.

The data recording application 5000 may reproduce, display, or store a user's image information and audio information which are captured by an electronic device in addition to handwriting information, such as letters or pictures (a handwriting trajectory), created on the medium by the user. Also, the data recording application 5000 may output other image information or audio information stored in the electronic device and then reproduce, replay, or store the output image information or audio information in addition to the handwriting information as necessary.

In FIG. 1, it is shown that one medium 1000-1 corresponds to one electronic pen 2000-1. However, a correspondence between the medium 1000 and the electronic pen 2000 may be 1:N or N:1.

In addition, FIG. 1 shows that one electronic pen 2000-1 corresponds to one electronic device 3000-1. However, a correspondence between the electronic pen 2000 and the electronic device 3000 may also be 1:N or N:1.

Furthermore, FIG. 1 shows that a plurality of electronic devices 3000 are connected to one server 4000. However, the system according to embodiments of the present invention may include two or more servers.

Meanwhile, FIG. 1 shows that the electronic pen 2000 communicates with the electronic device 3000 and that the electronic device 3000 communicates with the electronic pen 2000 and the server 4000. However, the electronic pen 2000 may directly communicate with the server 4000 as necessary.

<Medium>

Subsequently, the medium 1000 associated with embodiments of the present invention will be described.

FIG. 2 is a diagram showing a medium associated with embodiments of the present invention.

Referring to FIG. 2, the medium 1000 may be classified into a blank medium 1200 and a graphic medium 1400. The blank medium 1200 may refer to a medium consisting mostly of blank space in which handwriting is possible, such as an exercise book. As shown in an upper portion FIG. 2, the blank medium 1200 may be a medium consisting of a plurality of sheets, such as an exercise book, and may be a medium consisting of one sheet. One sheet of the blank medium 1200 consisting of a plurality of sheets may be referred to as a sub-medium. When the electronic pen 2000 is implemented as an optical-electronic pen, at least some or all pages included in the exercise book may each have a pattern code according to embodiments of the present invention.

Only at least a partial region of the whole surface of a page included in the exercise book may be implemented as a medium 1000 according to embodiments of the present invention. For example, when the electronic pen 2000 is implemented as an optical-electronic pen, a pattern code may be provided not over the whole surface of the page included in the exercise book but in a partial region thereof.

The graphic medium 1400 may be a medium including a specific graphic composed of letters or pictures, as shown in a lower portion of FIG. 2. The graphic medium 1400 may be generated by printing a document file desired by a user on the blank medium 1200. The graphic medium 1400 may also be a single medium and may include a plurality of sub-media. When a document file to be printed by a user has a plurality of sheets, the graphic medium 1400 may include a plurality of sub-media. A pattern code may be provided even on a surface of the graphic medium 1400. The graphic medium 1400 will be described in detail below.

Although not shown, the medium 1000 according to embodiments of the present invention may be implemented in the form of a blackboard or the like. That is, the medium 1000 according to embodiments of the present invention may be implemented in the form of a blackboard (an electronic blackboard) including a pattern code.

<Electronic Pen>

Subsequently, an electronic pen according to embodiments of the present invention will be described.

Figure 3:
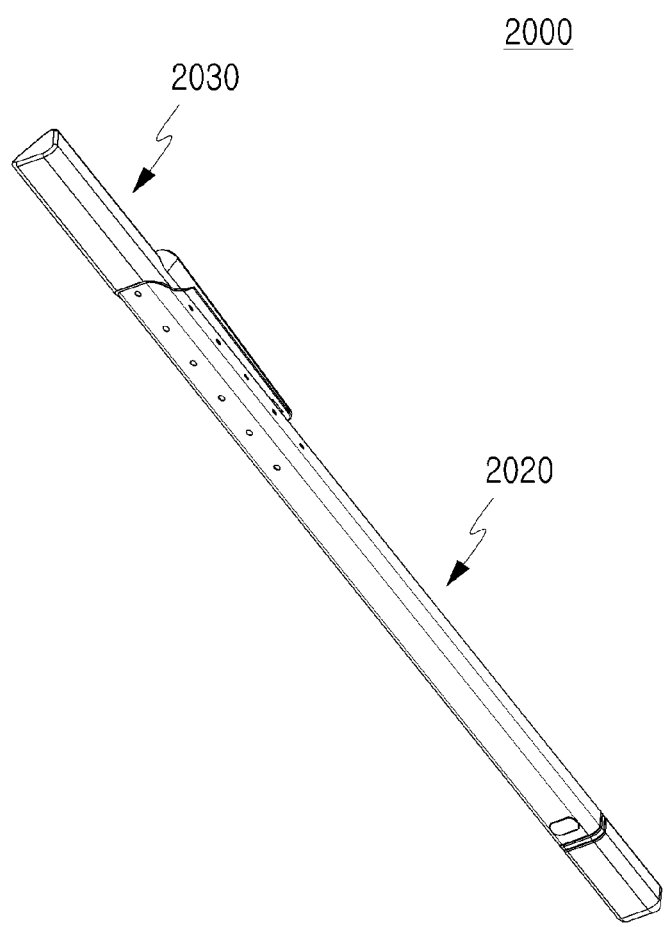
FIG. 3 is a diagram showing an example appearance of the electronic pen according to embodiments of the present invention.
Figure 4:
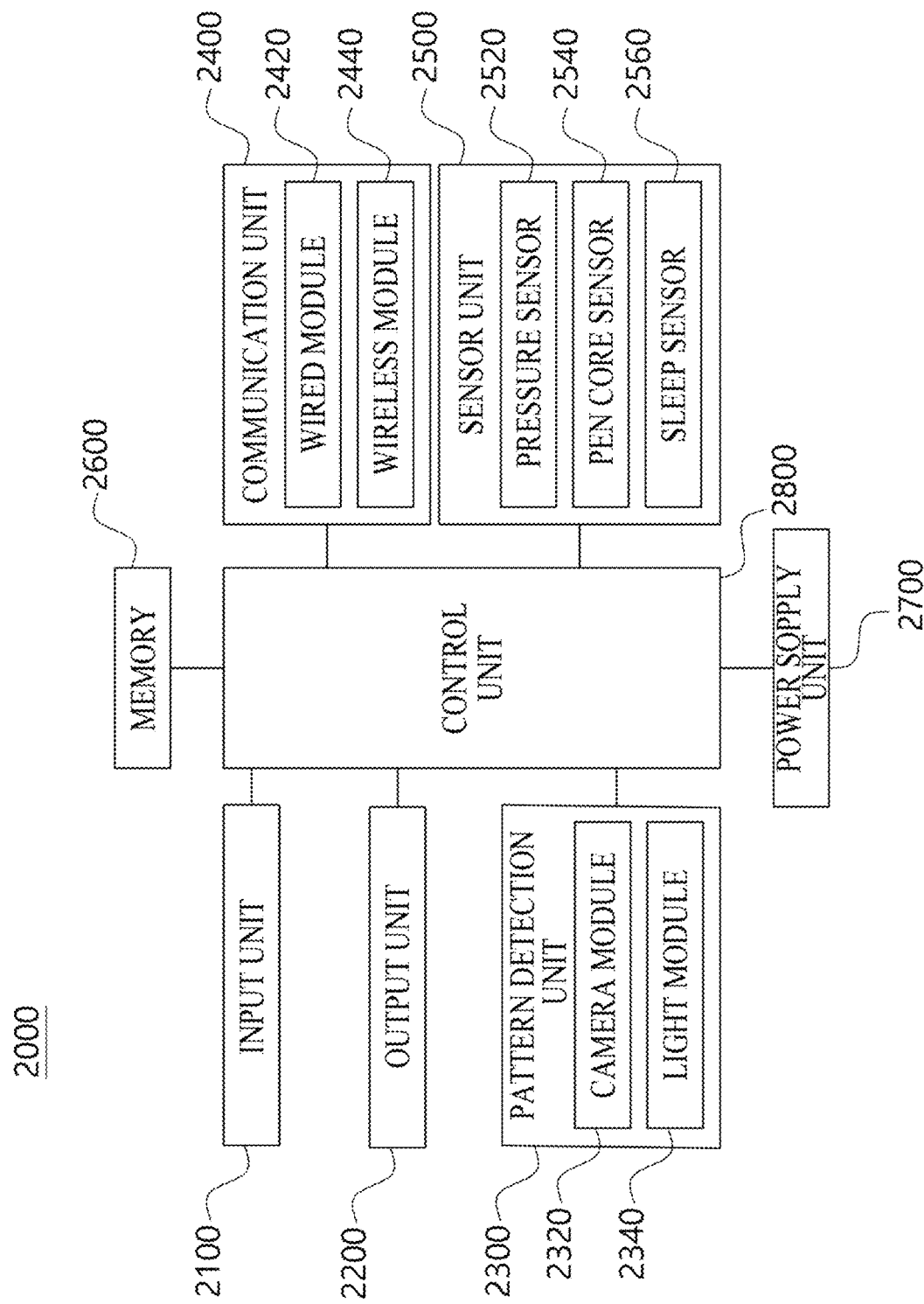
FIG. 4 is a block diagram illustrating elements of the electronic pen according to embodiments of the present invention.

FIG. 3 is a diagram showing an example appearance of the electronic pen according to embodiments of the present invention, and FIG. 4 is a block diagram illustrating elements of an electronic pen according to embodiments of the present invention.

Referring to FIG. 3, the electronic pen 2000 may largely include a main body part 2020 configured to fix a tip part capable of handwriting a note on the medium 1000, a cap part 2030 configured to protect the tip part while the electronic pen 2000 is in an unused state, etc.

Here, the unused state may refer to a state in which the electronic pen 2000 according to an embodiment of the present invention is keepped. In this state, the tip part is not exposed to the outside, and thus it may not be possible to handwrite a note on a medium.

The tip part is an element capable of handwriting a note on a medium and may include a ball and contain ink. In this case, the ink may include various forms such as oily, aqueous, and neutral inks.

Also, the tip part may be a graphite lead which is used in a pencil or may be a tip used in a general writing instrument.

The main body part 2020 is an element configured to allow insertion of the tip part such that a portion of the tip part is exposed and then to fix the tip part and may refer to a kind of grip part that may be gripped by a user's hand.

The cap part 2030 may have a predetermined internal space into which one side of the main body part 2020 is insertable in the unused state to protect the tip part and may allow handwriting by exposing a portion of the tip part to the outside when the cap part 2030 is inserted into the other side of the main body part 2020.

However, when the cap part 2030 enables a note to be written with the tip part 2010, the cap part 2030 does not necessarily need to be inserted into the other side of the main body part 2020 and may be separated from the main body part 2020 and placed in a predetermined space.

Referring to FIG. 4, the electronic pen 2000 according to an embodiment of the present invention may include an input unit 2100, an output unit 2200, a pattern detection unit 2300, a communication unit 2400, a sensor unit 2500, a memory 2600, a power supply unit 2700, a control unit 2800, etc. However, the elements shown in FIG. 4 are not essential, and thus the electronic pen may be implemented to have more elements or fewer elements than those shown in FIG. 4.

The elements of the electronic pen 2000 will be sequentially described below.

The input unit 2100 may receive a user input from a user. The user input may be achieved in various forms, including a button input, a key input, a touch input, and a voice input. For example, the electronic pen 2000 may receive a button input from a user to control power on/off of the electronic pen 2000.

As an example, the input unit 2100 is a comprehensive concept including a touch sensor configured to detect a user's touch, a microphone configured to receive a voice signal, a camera configured to recognize a gesture or the like through image recognition, a proximity sensor composed of an illumination sensor or infrared sensor for detecting a user's approach, a motion sensor configured to recognize a user's motion through an acceleration sensor, a gyro sensor or the like, and various other input units configured to detect or receive various user inputs as well as a typical button, a typical jog wheel, etc.

The output unit 2200 may output and provide various kinds of information to a user. The output unit 2200 should be interpreted as a comprehensive concept including a display configured to output visible light that is recognizable through the visual sense of a user, a speaker configured to output sounds that are recognizable through the auditory sense of a user, a haptic device configured to generate vibration that is recognizable through the tactile sense of a user, and various other output units. For example, the electronic pen 2000 may output a predetermined specific sound through a buzzer or the like that is included in the electronic pen 2000 in order to provide a user with information regarding whether the electronic pen 2000 is switched from a power-on state to a power-off state, whether the electronic pen 2000 is switched from a power-off state to a power-on state, etc. As another example, the electronic pen 2000 may output predetermined visible light through a display such as an LED lamp in order to provide a user with information on an operation state of the electronic pen 2000.

The pattern detection unit 2300 is configured to detect a pattern code into which position information for determining the position of the electronic pen 2000 with respect to the medium 1000 is encoded and includes a camera module 2320 and a lighting module 2340.

The camera module 2320 is configured to acquire an image of a pattern code image which is provided in the medium 1000. The camera module 2320 acquires an image of a partial region of the pattern code that is provided in the medium 1000 according to a predetermined time interval (e.g., 1/60 seconds, 1/240 seconds, or the like) while the electronic pen 2000 is moving on the medium 1000 depending on a user's handwriting. Thus, the electronic pen 2000 may interpret information on a unit cell included in the acquired image according to a pattern code interpretation method to interpret the position of the electronic pen 2000 with respect to the electronic pen 2000 in the form of coordinates.

The lighting module 2340 emits light of a predetermined specific frequency to the medium 1000 so that the image of the pattern code can be acquired through the camera module 2320. The pattern code provided in the medium 1000 according to an embodiment of the present invention may be printed using ink capable of absorbing infrared light. In this case, the lighting module 2340 may emit, to the medium 1000, light of wavelengths that may be well absorbed by the ink. In this case, the camera module 2320 may be configured to capture an image for an infrared band. To this end, the camera module 2320 may include an infrared filter for selectively passing only the infrared band.

The communication unit 2400 may communicate with an external apparatus. For example, the electronic pen 2000 may communicate with the electronic device 3000, the server 4000, or the like through the communication unit 2400. Thus, the electronic pen 2000 may transmit or receive various kinds of information to or from an external apparatus. For example, the electronic pen 2000 may transmit pen data or the like generated by the electronic pen 2000 to the electronic device 3000 or the server 4000 through the communication unit 2400 and may receive commands and/or data for controlling operation of the electronic pen 2000 or providing information necessary for the electronic pen 2000 from the electronic device 3000 or the server 4000 through the communication unit 2400.

The communication unit 2400 may include a wired module 2420 and a wireless module 2440.

The wired module 2420 is a module for transmitting or receiving data to or from an external apparatus in a wired manner and may include elements such as a USB port, a PS/2 port, a parallel port, a serial port, etc., which may transmit or receive data to or from the external apparatus, and may further include an Ethernet port for accessing the Internet through a local area network (LAN).

The wireless module 2440 may include mobile communication modules that access a mobile communication network via a mobile communication base station to transmit or receive data, short-range communication modules that use a wireless local area network (WLAN)-based communication scheme such as Wi-Fi or a wireless personal area network (WPAN)-based communication scheme such as Bluetooth and Zigbee, etc.

The sensor unit 2500 may sense a variety of information. Here, the variety of information may be utilized to generate a control signal for controlling operation of the electronic pen 2000 and may be used to generate pen data generated by the electronic pen 2000. The variety of information sensed through the sensor unit 2500 may be provided to the electronic device 3000 or the server 4000.

The sensor unit 2500 may include a pressure sensor 2520, a pen core sensor 2540, a sleep sensor 2560, etc.

The pressure sensor 2520 may sense pressure that is generated when a user is writing by hand. For example, when a user handwrites a note using the electronic pen 2000, the electronic pen 2000 comes into contact with a handwriting surface, and pressure generated at this point may be sensed by the pressure sensor 2520. In particular, the pressure sensor 2520 may be provided to a rear end (i.e., an end opposite to a pen tip, which is one of both ends of the pen core) of the pen core installed in the electronic pen 2000 and be configured to sense pressure. The electronic pen 2000 may use a pressure value sensed through the pressure sensor 2520 to generate pen data. In this case, the pressure value included in the pen data may be processed as pen pressure information regarding pen pressure applied to the medium 1000 upon a user's handwriting and then may be used to reproduce a note handwritten by a user. Alternatively, the electronic pen 2000 that has been in an off state may use a signal output through the pressure sensor 2520 as a trigger signal for turning on the electronic pen 2000.

The pen core sensor 2540 may detect a pen core identifier for indicating the type of the pen core (the tip part) installed in the electronic pen 2000. For example, a pen core identifier for indicating the color of the pen core (the tip part) may be provided outside the pen core (the tip part) installed in the electronic pen 2000. In this case, the pen core sensor 2540 may detect the pen core identifier through an optical method, a magnetic method, and various other available methods. A value sensed by the pen core sensor 2540 or information regarding the pen core (the tip part) interpreted using the sensed value may be provided to the electronic device 3000. The electronic device 3000 may use the provided information to reproduce a note handwritten by a user.

The sleep sensor 2560 may detect a state of the electronic pen 2000, which is used to determine whether the electronic pen 2000 that has been in an on state will automatically switch to the off state. For example, the sleep sensor 2560 may include an acceleration sensor or the like. Whether the electronic pen 2000 is moved may be detected through the acceleration sensor or the like. When it is determined on the basis of the value sensed through the sleep sensor 2560 that the electronic pen 2000 has not been moved for a predetermined time, the electronic pen 2000 may automatically switch to the off state.

According to some embodiments of the present invention, power is normally supplied to the elements included in the electronic pen 2000 and the elements may operate normally as necessary when the electronic pen 2000 is in the on state, and power is shut off to some or all of the elements included in the electronic pen 2000 and some or all of the elements included in the electronic pen 2000 cannot operate normally when the electronic pen 2000 is in the off state. In particular, according to some embodiments of the present invention, although the electronic pen 2000 is in the off state, power may be normally supplied to the pressure sensor 2520 and/or an interpretation module for interpreting a signal output from the pressure sensor 2520, etc. Thus, the electronic pen 2000 that has been in the off state may automatically switch to the on state on the basis of the sensed value that is output from the pressure sensor 2520.

The memory 2600 may store various kinds of information. The memory 2600 may temporarily or semi-permanently store data. An operating program such as firmware for driving the electronic pen 2000 may be stored in the memory 2600. As necessary, information, commands, and data needed to drive the electronic pen 2000, such as the pen data generated by the electronic pen 2000 and the sensed value output by the sensor unit 2500, may be stored.

Examples of the memory 2600 may include a hard disk drive (HDD), a solid-state drive (SSD), a flash memory, a read-only memory (ROM), a random access memory (RAM), etc.

The power supply unit 2700 may provide power necessary to operate the elements of the electronic pen 2000. The power supply unit 2700 may be implemented with a rechargeable battery. It is assumed that the communication unit 2400 of the electronic pen 2000 includes a charging port (e.g., a USB port). When the electronic pen 2000 is connected to the electronic device 3000 through the charging port, power may be supplied from the electronic device 3000, and thus the battery may be charged.

The control unit 2800 controls the overall operation of the electronic pen 2000. To this end, the control unit 2800 may compute and process various kinds of information and may control operation of the elements of the electronic pen 2000.

Also, the control unit 2800 may analyze an image of a pattern code acquired by the pattern detection unit 2300 to decode information encoded into unit cells included in the image of the acquired pattern code and furthermore to acquire position coordinates of the medium 1000 of the electronic pen 2000 and identification information (e.g., book information or page information) of the medium 1000 from the decoded information.

The control unit 2800 may generate pen data on the basis of information acquired by decoding the information encoded into the unit cells. As described above, the generated pen data may be stored in the memory 2600 or may be transmitted to the electronic device 3000 and/or the server 4000 through the communication unit 2400. The generation of the pen data will be described in detail below.

The control unit 2800 may be classified into a first control unit for controlling general operation of the electronic pen 2000 and a second control unit for analyzing an image acquired by the pattern detection unit 2300, decoding information encoded into a unit cell, and generating the above-described pen data. The control unit 2800 may be logically divided into the first control unit and the second control unit. However, the first control unit and the second control unit may be physically separated from each other.

The control unit 2800 may be implemented with a computer or the like in hardware, software, or a combination thereof. A control module implemented in hardware may be provided in the form of an electronic circuit for processing an electrical signal to perform a control function, and a control unit implemented in software may be provided in the form of a program for driving the control module implemented in hardware.

In the following description, unless otherwise specified, the operation of the electronic pen 2000 may be interpreted as being performed by control of the control unit 2800.

<Electronic Device>

Subsequently, the electronic device 3000 according to embodiments of the present invention will be described.

Figure 5:
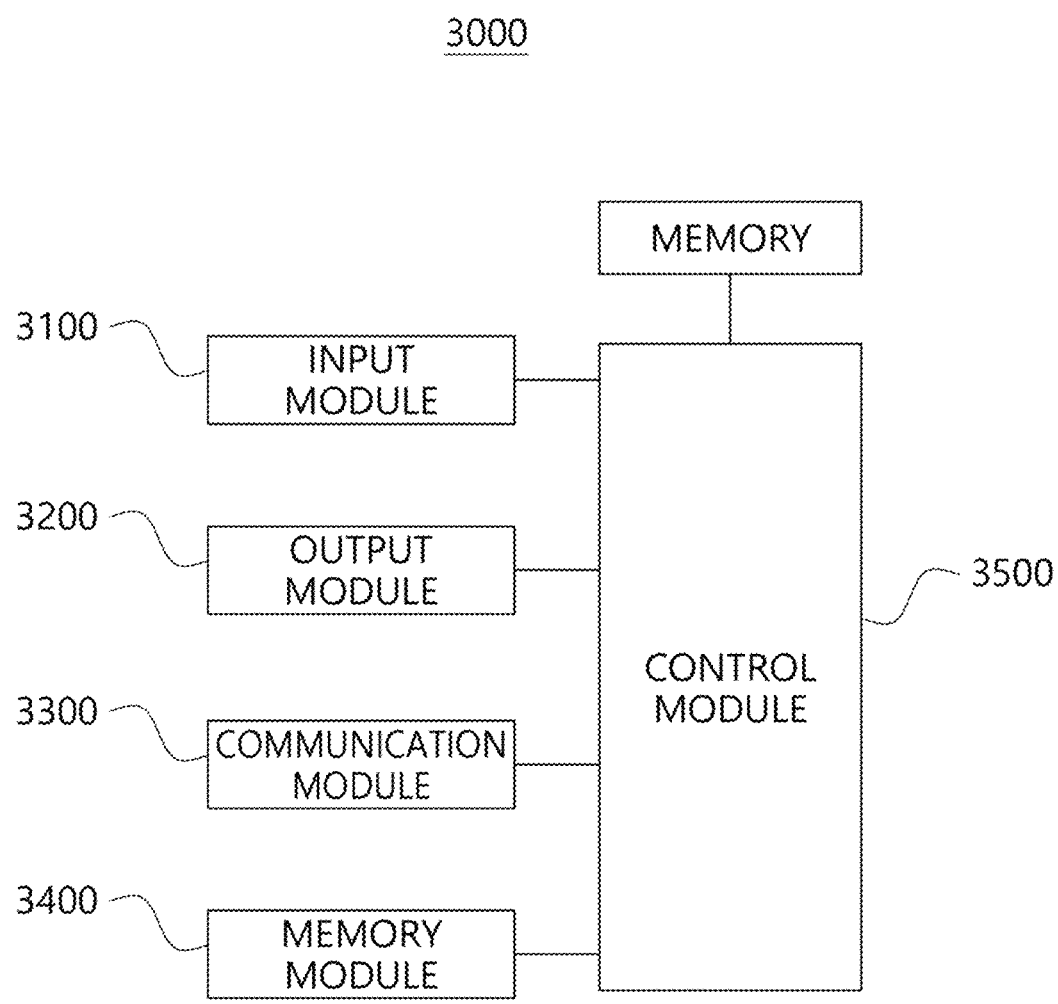
FIG. 5 is a block diagram illustrating elements of the electronic device according to embodiments of the present invention.

FIG. 5 is a block diagram illustrating elements of the electronic device according to embodiments of the present invention.

Referring to FIG. 5, the electronic device 3000 may include an input module 3100, an output module 3200, a communication module 3300, a memory module 3400, and a control module 3500. However, the elements shown in FIG. 5 are not essential, and thus the electronic device may be implemented to have more elements or fewer elements than those shown in FIG. 5.

The elements of the electronic device 3000 will be sequentially described below.

The input module 3100 may receive a user input from a user. The user input may be achieved in various forms, including a key input, a touch input, and a voice input. As an example, the input module 3100 for receiving such a user input is a comprehensive concept including a touch sensor configured to detect a user's touch, a microphone configured to receive a voice signal, a camera configured to recognize a gesture or the like through image recognition, a proximity sensor composed of an illumination sensor or infrared sensor for detecting a user's approach, a motion sensor configured to recognize a user's motion through an acceleration sensor, a gyro sensor or the like, and various other input units configured to detect or receive various user inputs as well as a typical button, a typical jog wheel, etc. Here, the touch sensor may be implemented with a resistive or capacitive touch sensor for detecting a touch through a touch panel or a touch film attached to a display panel, an optical touch sensor for detecting a touch in an optical manner, etc.

The output module 3200 may output and provide various kinds of information to a user. The output module 3200 is a comprehensive concept including a display configured to output visible light that is recognizable through the visual sense of a user, a speaker configured to output sounds that are recognizable through the auditory sense of a user, a haptic device configured to generate vibration that is recognizable through the tactile sense of a user, and various other output units.

The display may output an image for reproducing a note handwritten by a user with the electronic pen 2000 and/or the electronic device 3000 according to an embodiment of the present invention.

Also, the display is a broad concept of an image display device, including a liquid crystal display (LCD), a light-emitting diode (LED) display, an organic light-emitting diode (OLED) display, a flat panel display (FPD), a transparent display, a curved display, a flexible display, a three-dimensional (3D) display, a holographic display, a projector, and various other devices for performing an image output function. The display may be a touch display formed integrally with a touch sensor of the input module 3100.

The communication module 3300 may communicate with an external apparatus. For example, the electronic device 3000 may communicate with the electronic device 3000 or the server 4000 through the communication module 3300. Thus, the electronic device 3000 may transmit or receive various kinds of information to or from an external apparatus. For example, through the communication module 3300, the electronic device 3000 may receive pen data or the like generated by the electronic pen 2000 and may transmit necessary information to the electronic pen 2000. Also, through the communication module 3300, the electronic device 3000 may transmit the pen data received from the electronic pen 2000 or stroke data acquired by interpreting the pen data to the server 4000 and may receive necessary information from the server 4000.

The communication module 3300 may be configured with a wired communication module configured to access the Internet or the like through a local area network (LAN), including a LAN port, a USB port, a PS/2 port, a parallel port, and a serial port, a mobile communication module configured to access a mobile communication network via a mobile communication base station to transmit or receive data, a short-distance communication module using a wireless local area network (WLAN)-based communication scheme such as Wi-Fi or a wireless personal area network (WPAN)-based communication scheme such as Bluetooth and Zigbee, a satellite communication module using Global Navigation Satellite System (GNSS) such as Global Positioning System (GPS), or a combination thereof.

The memory module 3400 may store various kinds of information. The memory module 3400 may temporarily or semi-permanently store data. An operating system (OS) for driving the electronic device 3000 may be stored in the memory module 3400, and various kinds of data received from the electronic pen 2000, an application program for processing the various kinds of data received from the electronic pen 2000, etc. may be stored in the memory module 3400 if necessary.

Examples of the memory module 3400 may include a hard disk drive (HDD), a solid-state drive (SSD), a flash memory, a read-only memory (ROM), a random access memory (RAM), etc.

The control module 3500 controls overall operation of the electronic device 3000. To this end, the control module 3500 may compute and process various kinds of information and may control operation of the elements of the electronic device 3000.

The control module 3500 may be implemented with a computer or the like in hardware, software, or a combination thereof. A control module implemented in hardware may be provided in the form of an electronic circuit for processing an electrical signal to perform a control function, and a control unit implemented in software may be provided in the form of a program for driving the control module implemented in hardware.

In the following description, unless otherwise specified, the operation of the electronic device 3000 may be interpreted as being performed by control of the control module 3500.

<Description of Driving of Electronic Device>

Figure 6:
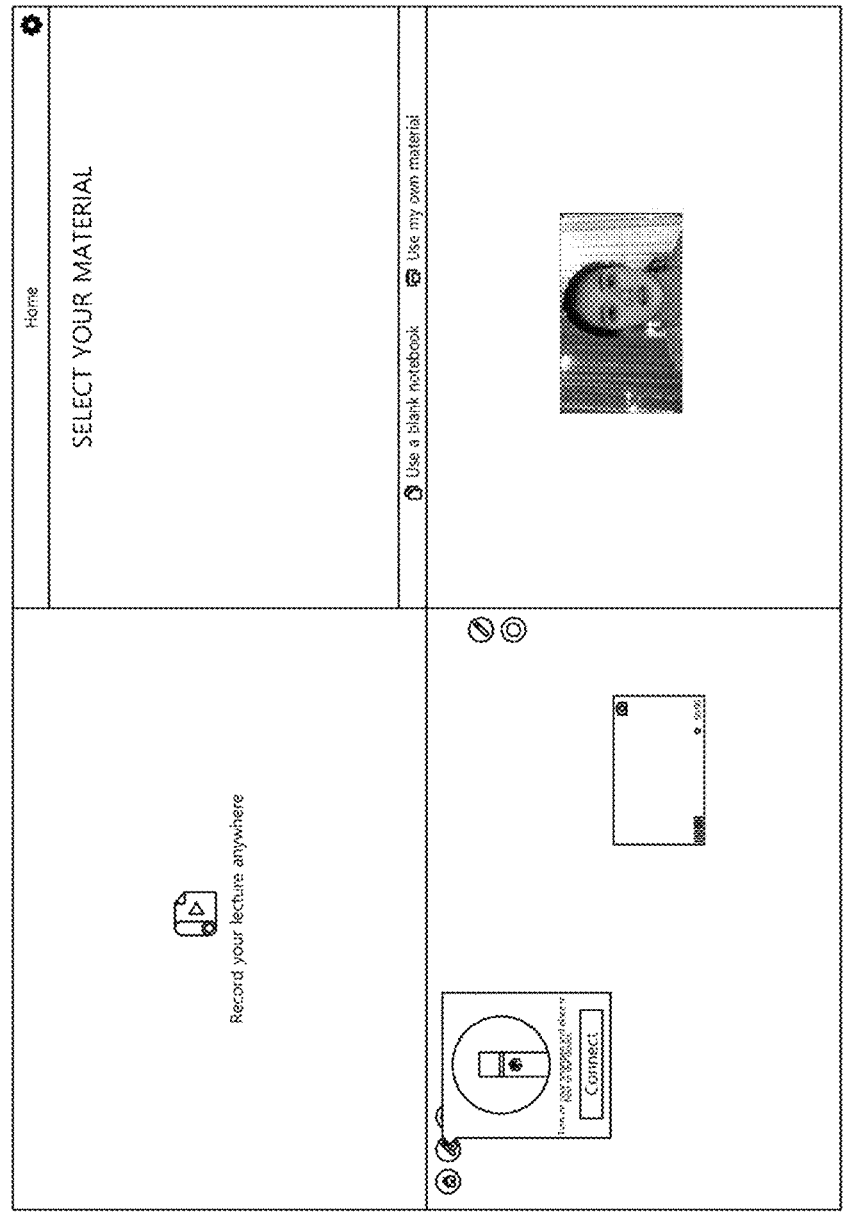
FIG. 6 is a diagram illustrating a screen in which a data recording application is displayed on the electronic device according to embodiments of the present invention.

FIG. 6 is a diagram illustrating a screen in which a data recording application is displayed on the electronic device according to embodiments of the present invention.

Referring to FIG. 6, the data recording application 5000 according to embodiments of the present invention is an authoring tool that creates lecture materials or produces materials to explain contents to viewers using the electronic pen 2000.

The data recording application 5000 may be software. Accordingly, the data recording application 5000 may be installed and operated in the electronic device 3000 in the form of an application. The data recording application may be installed and operated in the electronic device while stored in a recording medium in the form of software. The data recording application may be stored in a specific server and downloaded by a user who wants to use the data recording application.

The data recording application 5000 may include program codes for performing a specific function on the electronic device 3000. The data recording application 5000 may be stored in a memory module and may provide necessary functions to the electronic device 3000 by an operating system or the control module 3500 of the electronic device 3000 when the data recording application is running. Accordingly, the functions provided by the data recording application 5000 may be implemented on the electronic device 3000 in communication with the input module 3100, the output module 3200, the communication module 3300, the memory module 3400, and the control module 3500 of the electronic device 3000.

The data recording application 5000 and the electronic device 3000 are separate elements which correspond to software and hardware, respectively. However, since the data recording application 5000 is driven in the electronic device 3000, there is no need for strict division therebetween. The following description according to embodiments of the present invention may be applied to both of the data recording application 5000 and the electronic device 3000. That is, even when the following description of the present invention is based on the data recording application 5000, the description may be regarded as being about the electronic device 3000 because the data recording application 5000 runs on the electronic device 3000. Accordingly, the following description focuses on the data recording application 5000, but it is assumed that the data recording application 5000 is implemented in the electronic device 3000.

The data recording application 5000 may reproduce a handwriting trajectory, such as letters or pictures, created on the medium 1000 by a user or a user's image information or audio information captured or recorded by the electronic device 3000 on the output module of the electronic device and may store the reproduced handwriting trajectory or image or audio information in a memory module. In this specification, the handwriting trajectory, such as letters or pictures, created on the medium by the user is referred to as handwriting information when the handwriting trajectory is reproduced on the output module of the electronic device.

Also, the data recording application 5000 may output other image information or audio information stored in the electronic device 3000 and then reproduce, replay, or store the output image information or audio information in addition to the handwriting information as necessary.

The data recording application 5000 may provide an option for selecting one of the blank medium 1200 and the graphic medium 1400 and may display an image of the selected medium on the display of the electronic device 3000.

The data recording application 5000 converts a document file stored in the electronic device 3000 into a file for the graphic medium 1400 so that the document file can be used by the data recording application 5000 and provides a user with a function of outputting the file to the graphic medium 1400. In this case, the graphic medium file may be produced as the graphic medium 1400 by being printed on the blank medium 1200 in which a pattern code is printed.

The electronic pen 2000 may acquire an image of at least a partial region of the pattern code included in the medium 1000 and may interpret information encoded into unit cells included in the acquired image to acquire position information.

While a user is handwriting a note, the electronic pen 2000 continuously acquires, processes, and stores an image of a pattern code and position information obtained through an interpretation of the image. As a result, the electronic pen 2000 may reproduce corresponding handwriting information on the data recording application 5000. The handwriting trajectory created on the medium by the electronic pen 2000 is digitized and processed into pen data, and the pen data may be reproduced as handwriting information on the electronic device 3000 on which the data recording application 5000 is running.

A method of the data recording application 5000 running on the electronic device 3000 will be described in detail below.

Figure 7:
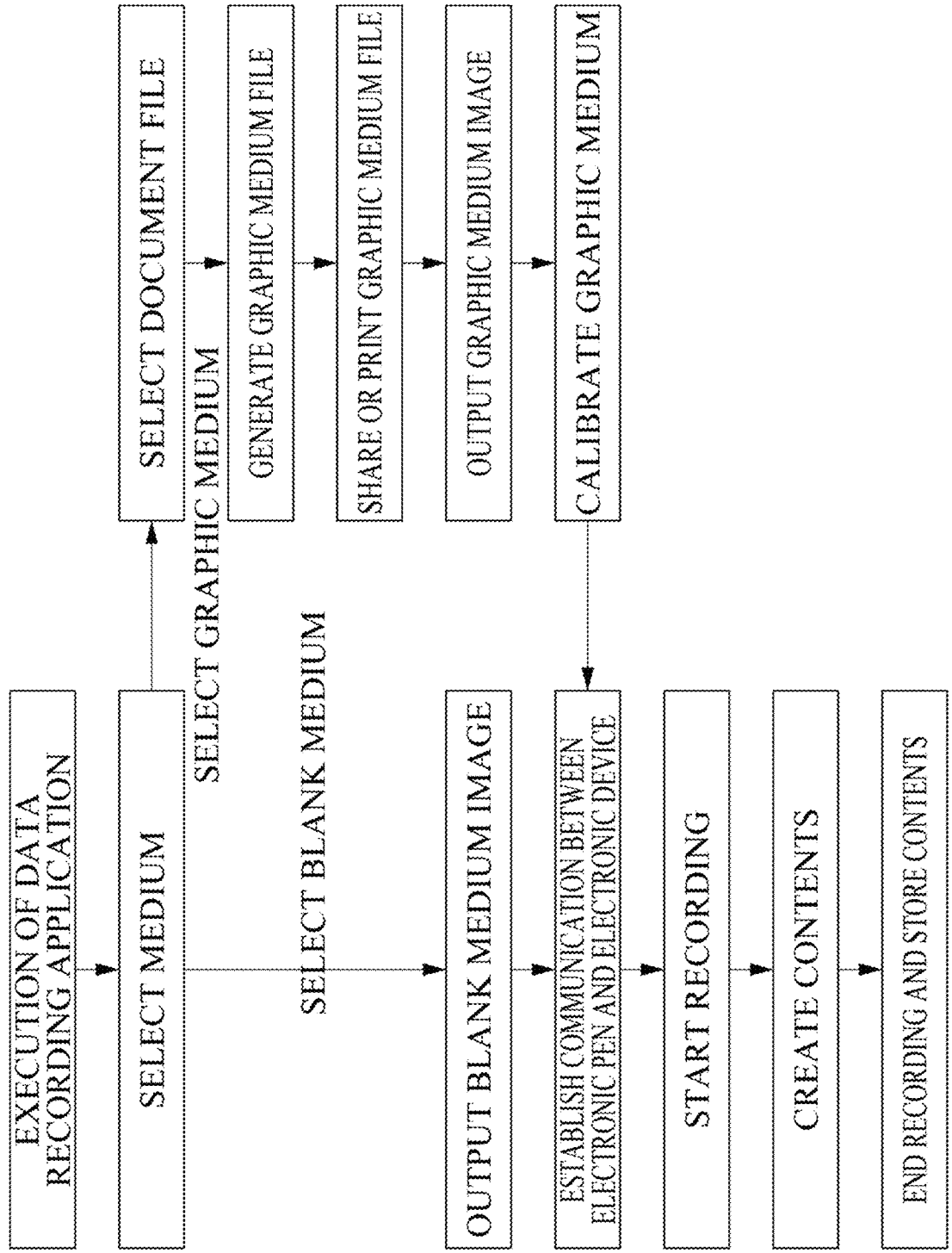
FIG. 7 is a flowchart in which the data recording application runs on the electronic device according to an embodiment of the present invention.

FIG. 7 is a flowchart in which the data recording application runs on the electronic device according to an embodiment of the present invention.

Referring to FIG. 7, the method includes steps of executing the data recording application 5000, selecting a medium, outputting a medium image to a display, establishing communication between the electronic pen 2000 and the electronic device 3000, starting recording contents, producing the contents, and ending the recording and storing the contents.

The step of selecting the medium 1000 may include selecting the blank medium 1200 and selecting the graphic medium 1400. When the blank medium 1200 is selected, a blank medium image may be output to the display of the electronic device 3000. When the graphic medium 1400 is selected, the additional steps of selecting a document file, generating the graphic medium file, sharing or printing the graphic medium file, outputting the graphic medium image to the display, calibrating the graphic medium 1400 may be sequentially performed. And then, pairing between the electronic pen 2000 and the electronic device 3000 may be conducted.

Here, contents are used to mean all information that can be output to the data recording application 5000. The contents may refer to handwriting information created on the medium 1000 by the electronic pen 2000 and reproduced on the display of the electronic device 3000, image information or audio information which is captured or recorded by the input module 3100 of the electronic device 3000, an event sound effect or an event visual effect which is generated by a menu selected from the menu medium 1500, image information or audio information which is displayed on the electronic device when the image file or the audio file stored in the electronic device 3000 is executed, image information or audio information which appears on the output module 3200 of the electronic device 3000 when an image file or an audio file linked to a web address is executed, or the like. In a narrow sense, the contents may refer to all information and records that appear on the display after video or sound recording starts in the data recording application 5000. The term "recording" may not only mean recording/storage of image information, but may also mean recording/storage of audio information. Accordingly, the term "recording" may also mean sound recording.

Figure 8:
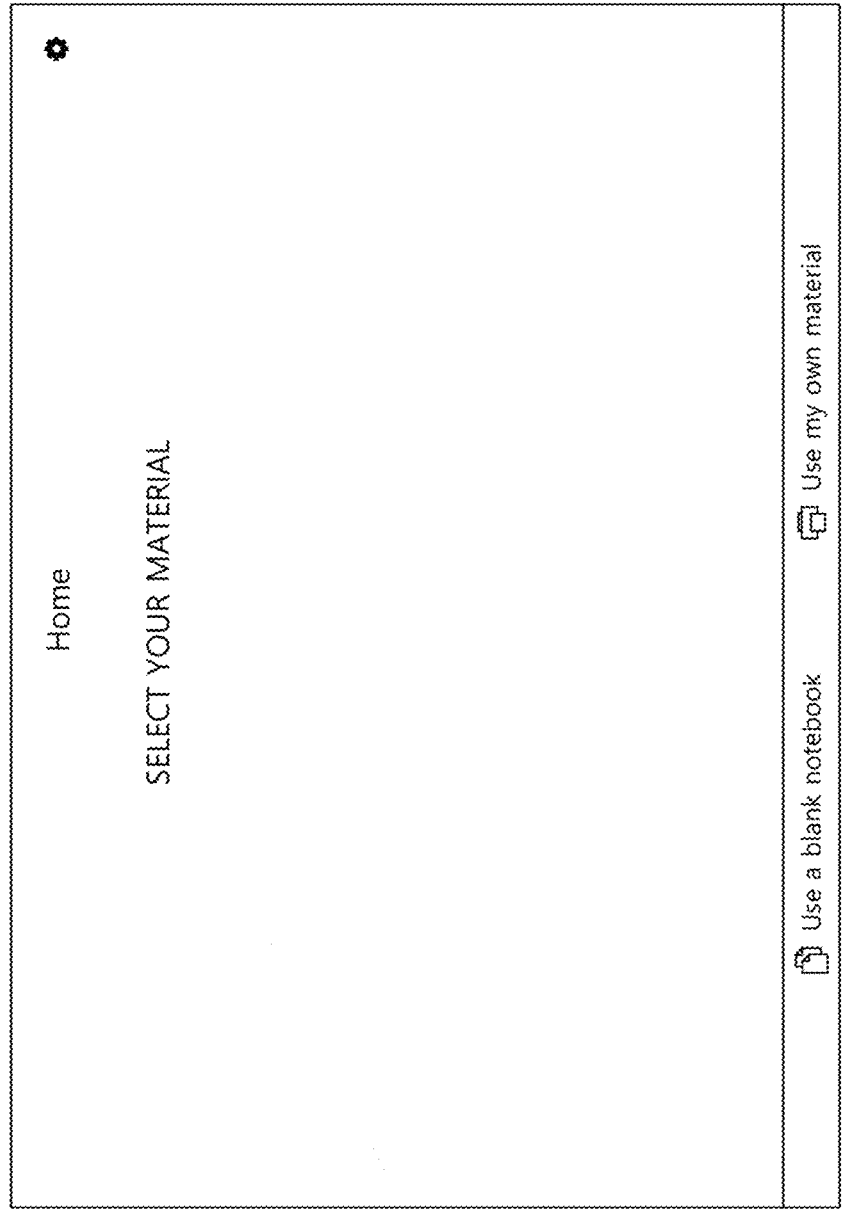
FIG. 8 is a screen that appears when the data recording application is executed according to embodiments of the present invention.

FIG. 8 is a screen that appears when the data recording application is executed according to embodiments of the present invention.

Referring to FIG. 8 together with FIG. 7, a step of selecting a medium after executing the data recording application 5000 will be described. The data recording application 5000 may guide a user to select the medium 1000. A file for the graphic medium 1400 may be generated by the user selecting the blank medium 1200 from a display, which is the output module 3200 of the electronic device, ("Use a blank notebook" in the drawing) or selecting a document file stored in the electronic device 3000 ("Use my own material" in the drawing).

The blank medium and the graphic medium, which are types of media, have been described above, and thus detailed descriptions thereof will be omitted.

Hereinafter, the operation of the data recording application for a case in which the blank medium 1200 is selected will be described first, and then a step of selecting the graphic medium 1400 will be described later.

Figure 9:
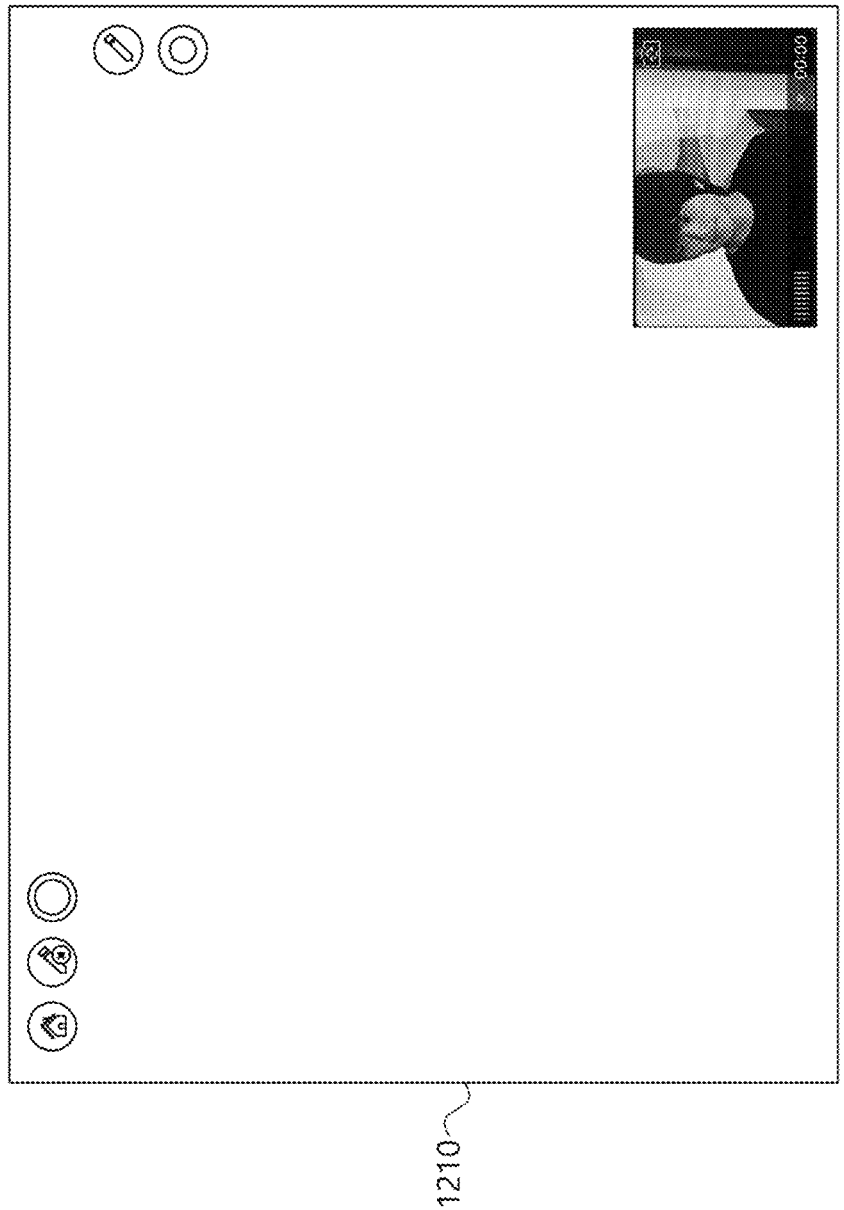
FIG. 9 is a screen of the data recording application that appears when a blank medium is selected according to embodiments of the present invention.

FIG. 9 is a screen of the data recording application that appears when a blank medium is selected according to embodiments of the present invention.

Referring to FIG. 9, when the blank medium 1200 is selected, a blank medium image 1210 is output to the display of the electronic device 3000. The image appearing in the data recording application may be different from the actual blank medium. In the data recording application 5000, the blank medium image 1210 is set to be black, but the color of the image may be any color, including white. Since the blank medium 1200 does not include any elements such as letters or pictures, the blank medium 1200 may be configured with an empty image when the blank medium 1200 is imaged through the data recording application 5000.

Figure 10:
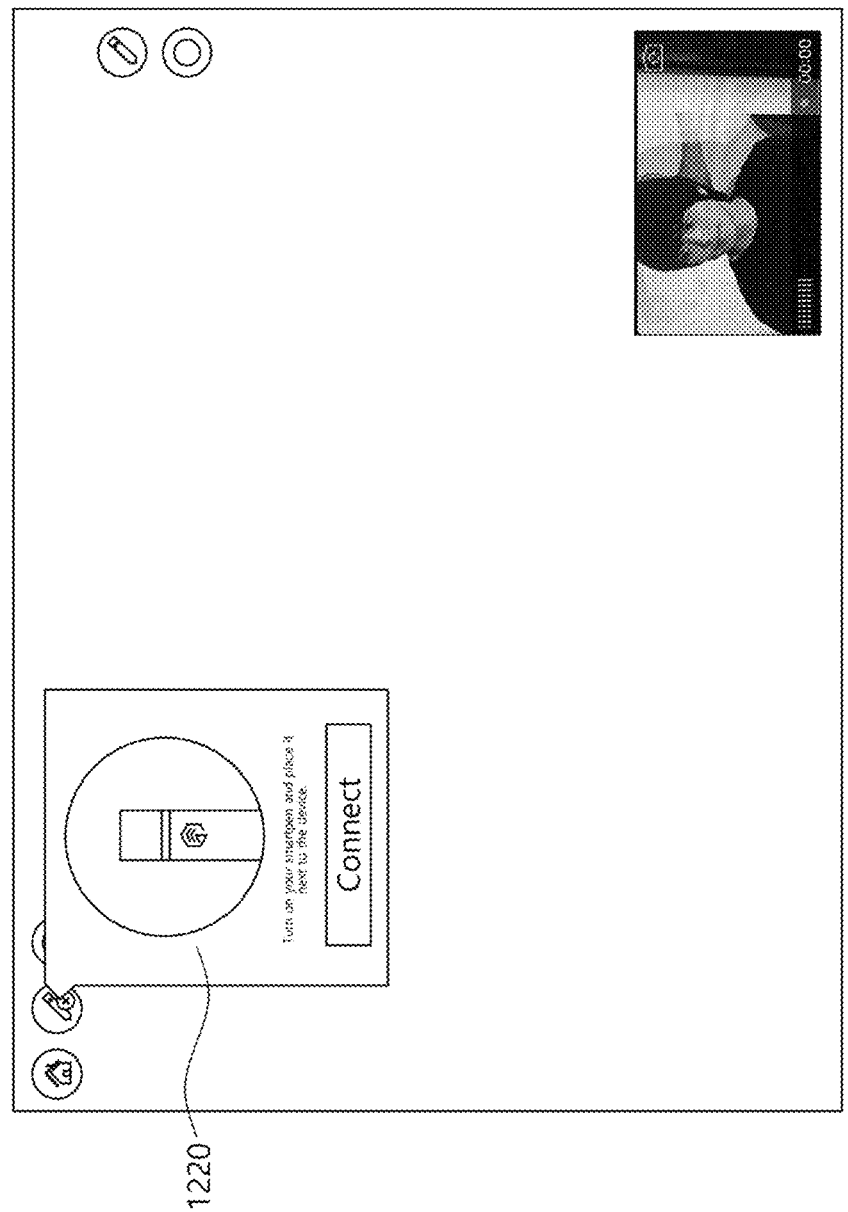
FIGS. 10 and 11 are screens for establishing communication between the electronic pen and the electronic device according to embodiments of the present invention.
Figure 11:
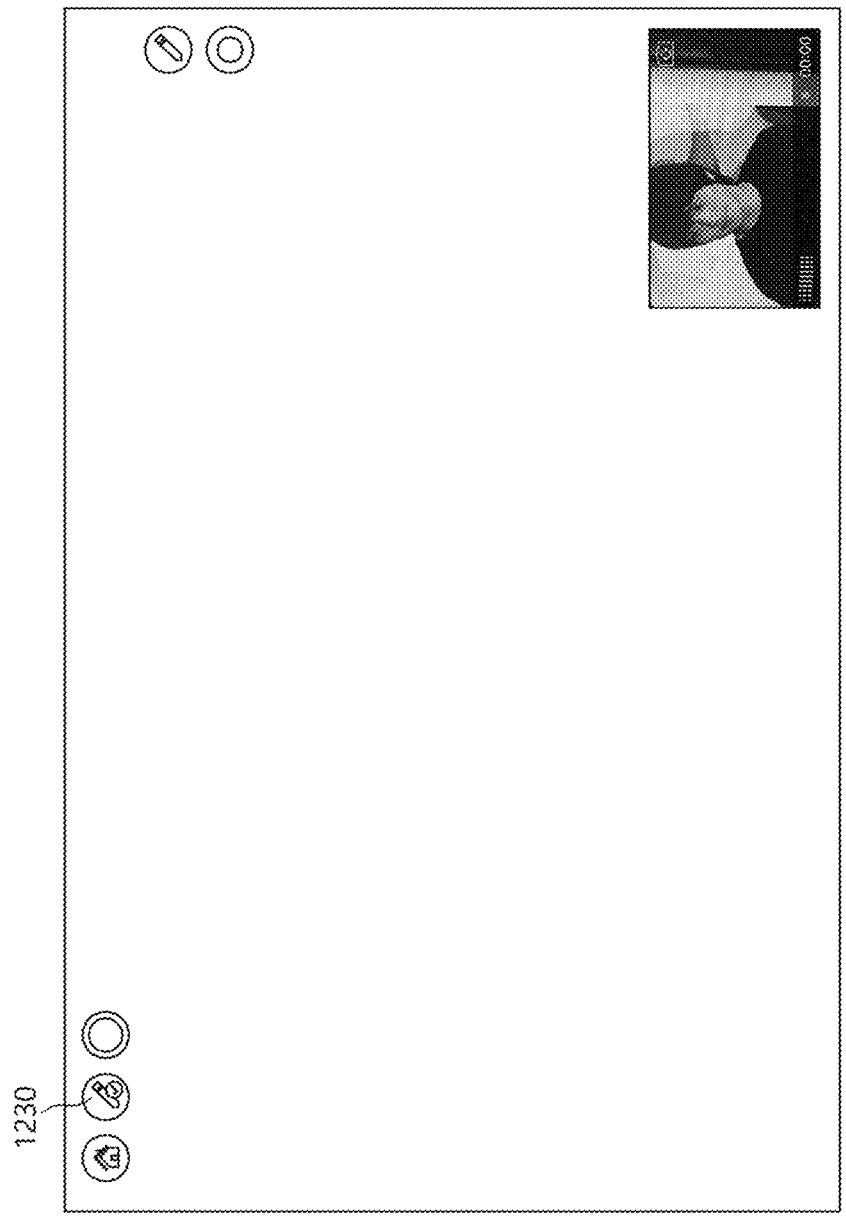

FIGS. 10 and 11 are screens for establishing communication between the electronic pen and the electronic device according to embodiments of the present invention.

Referring to FIGS. 10 and 11, the data recording application 5000 may generate a screen 1220 for requesting connection to the electronic pen 2000 and output the screen 1220 to the display of the electronic device 3000. The data recording application 5000 establishes a channel for communication between the electronic pen 2000 and the electronic device 3000. A communication channel is secured for the communication unit 2400 of the electronic pen 2000 and the communication module 3300 of the electronic device 3000 to exchange data using a wired or wireless communication method, and the securing of the communication channel may be referred to as pairing. A Bluetooth wireless communication method may be employed for the pairing. However, the present invention is not limited thereto, and any wired or wireless method may be used.

Thus, after the pairing between the electronic pen 2000 and the electronic device 3000 is completed by a user performing the pairing, an indication 1230 indicating that the pairing is completed may appear.

When the electronic pen 2000 is paired with the electronic device 3000, the data recording application 5000 may reproduce or display the handwriting information and the user's image information through the electronic pen 2000 even if recording has not started yet.

Figure 12:
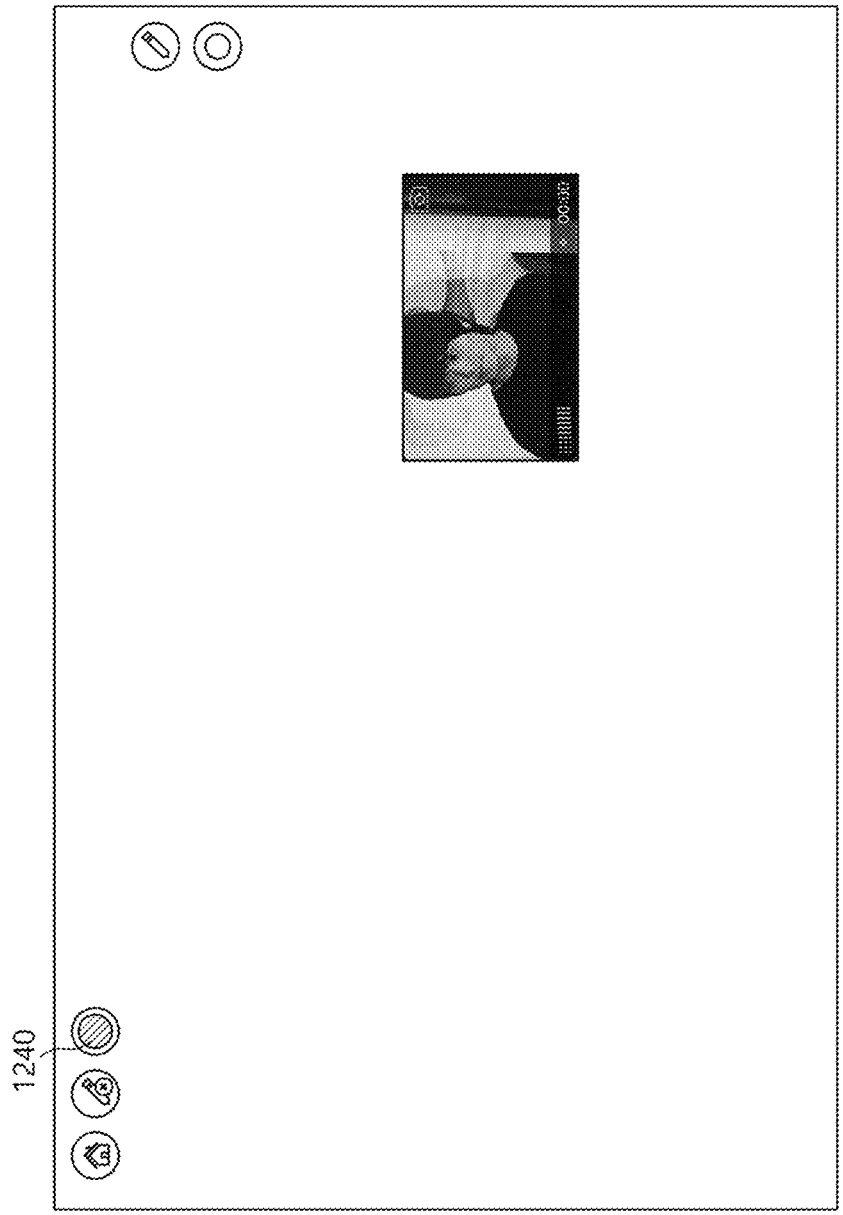
FIGS. 12 and 13 are screens indicating a step of the data recording application starting recording according to embodiments of the present invention.
Figure 13:
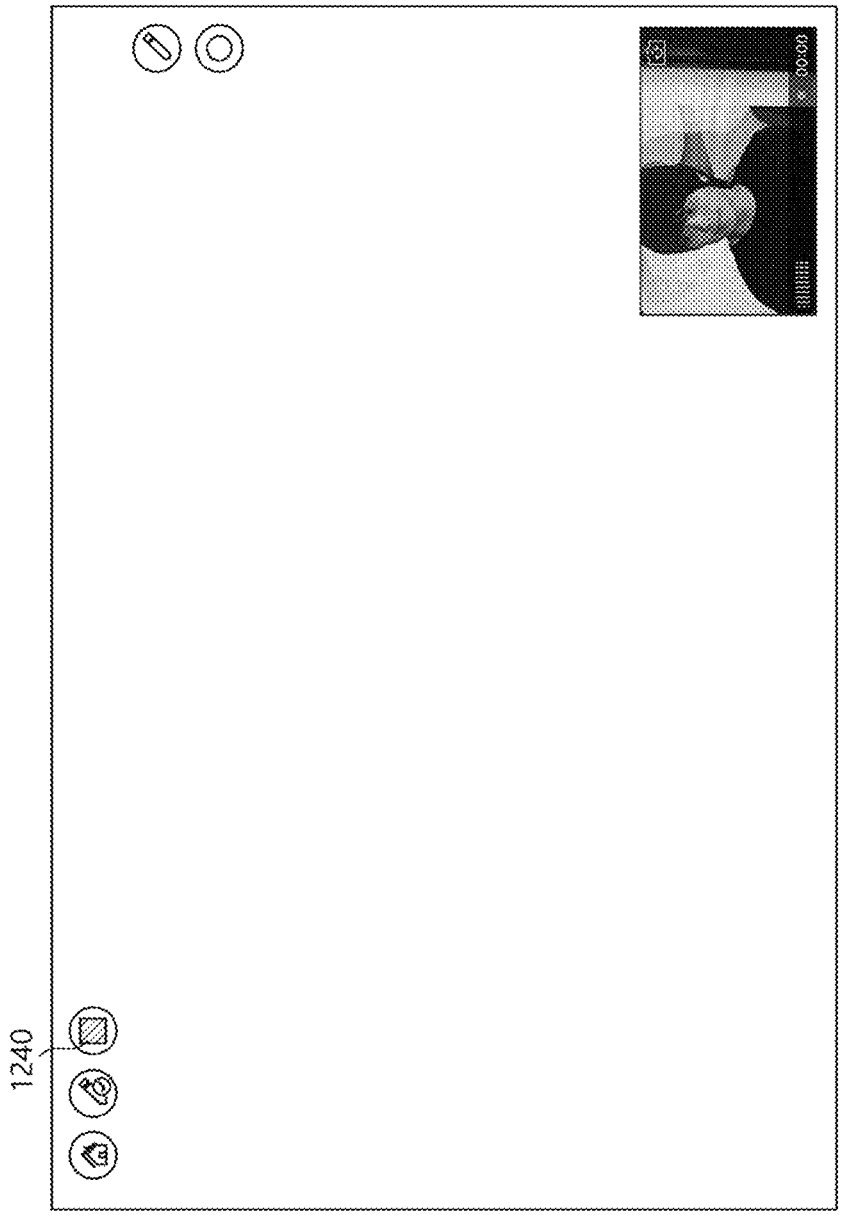
Figure 14:
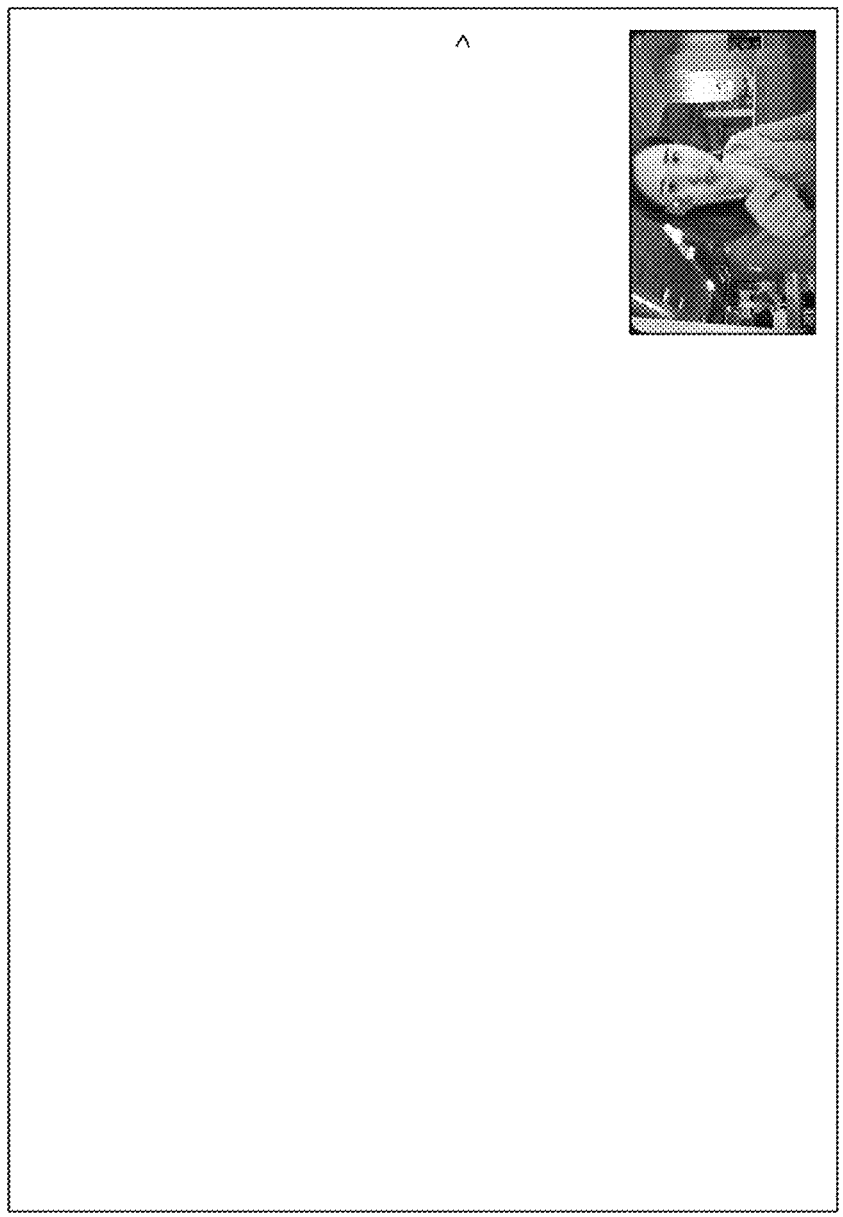
FIGS. 14 to 17 are diagrams showing a process of producing contents in a blank medium according to embodiments of the present invention.

FIGS. 12 and 13 are screens indicating a step of starting recording in the data recording application according to embodiments of the present invention.

Referring to FIGS. 12 and 13, the data recording application 5000 may start reproducing and recording contents by executing a record button 1240. When the recording starts, the indication of the record button 1240 may change from red to blue, and this change may indicate that the recording is starting. The color of the recording button is not represented in the drawing due to the requirement to use black and white drawings for PCT filing. However, the circle record button in FIG. 12 changes to a square after the button is clicked by a user. The colors and shapes of the button before and after the recording starts may vary depending on how the data recording application is produced. The start and end of the recording may even be performed through the menu medium 1500, which will be described below.

A process of reproducing, replaying, and recording a user's image or audio information and writing information created with the electronic pen 2000 will be described below.

FIGS. 14 to 17 are diagrams showing a process of producing contents in a blank medium according to embodiments of the present invention.

Referring to FIGS. 14 to 17, a woman in the drawings is producing contents using a blank medium.

A handwritten note such as pictures and letters created on the medium 1000 (hereinafter referred to as a handwriting trajectory) may be stored in the memory unit built in the electronic pen 2000 as pen data. The pen data may refer to information that is used to convert a user's handwriting trajectory into stroke data in the electronic device 3000. The handwriting trajectory created on the medium may be digitized and converted into first pen data. The stroke data may be information that is used by the electronic device 3000 to receive the pen data from the electronic pen 2000 and indicate the handwriting trajectory created on the medium in the electronic device 3000. The electronic device 3000 may receive the pen data from the electronic pen 2000, interpret the received pen data, and then generate the stroke data. The handwriting information may be defined as a minimum unit piece of the stroke data or the sum of pieces of the stroke data greater than the minimum unit piece and may mean that a type of handwriting trajectory appearing on the medium is implemented on the display of the electronic device 3000.

That is, the handwriting trajectory on the medium may be stored in the electronic pen as the pen data, and the pen data may be received by the electronic device, interpreted, and then converted into the stroke data. The stroke data may be referred to as the handwriting information 1260 when the stroke data is reproduced on the electronic device.

The handwriting trajectory, such as pictures or letters, created on the medium 1000 may be reproduced in the medium image 1210 of the data recording application as the handwriting information 1260 in real time. FIGS. 14 to 17 show that the handwriting trajectories of a bear picture and letters are reproduced as handwriting information in the order of the drawings.

In addition, image information 1270 and voice information (not shown) of a user who is handwriting a note may be captured or recorded through a camera or microphone built in the electronic device 3000 and then may be displayed on the display. The image information 1270 and voice information of the user may be stored in the memory module 3400 of the electronic device 3000.

The electronic device 3000 may include a first camera provided at a front surface and a second camera provided at a rear surface, and the image information 1270 may be captured by the first camera or the second camera. When a user entering the handwriting information 1260 wants to film himself or herself, the first camera, which is located on the display side, may be used. When the user does not want to film himself or herself, a background or object located at the rear side may be captured through the second camera. The photographing function may be turned off through the menu medium 1500 or the menu provided by the data recording application 5000.

A region of the display of the electronic device 3000 where the handwriting information 1260 is reproduced may be referred to as a first window 1310, and another region where a user's appearance is displayed may be referred to as a second window 1320. The first window may be wider than the second window to encompass the area of the second window. In the first window, the position of the second window may be adjusted by a user touching and dragging. In the drawing, an example in which the second window is located at the lower right of the display is shown, but the second window may be located anywhere within the first window.

Figure 15:
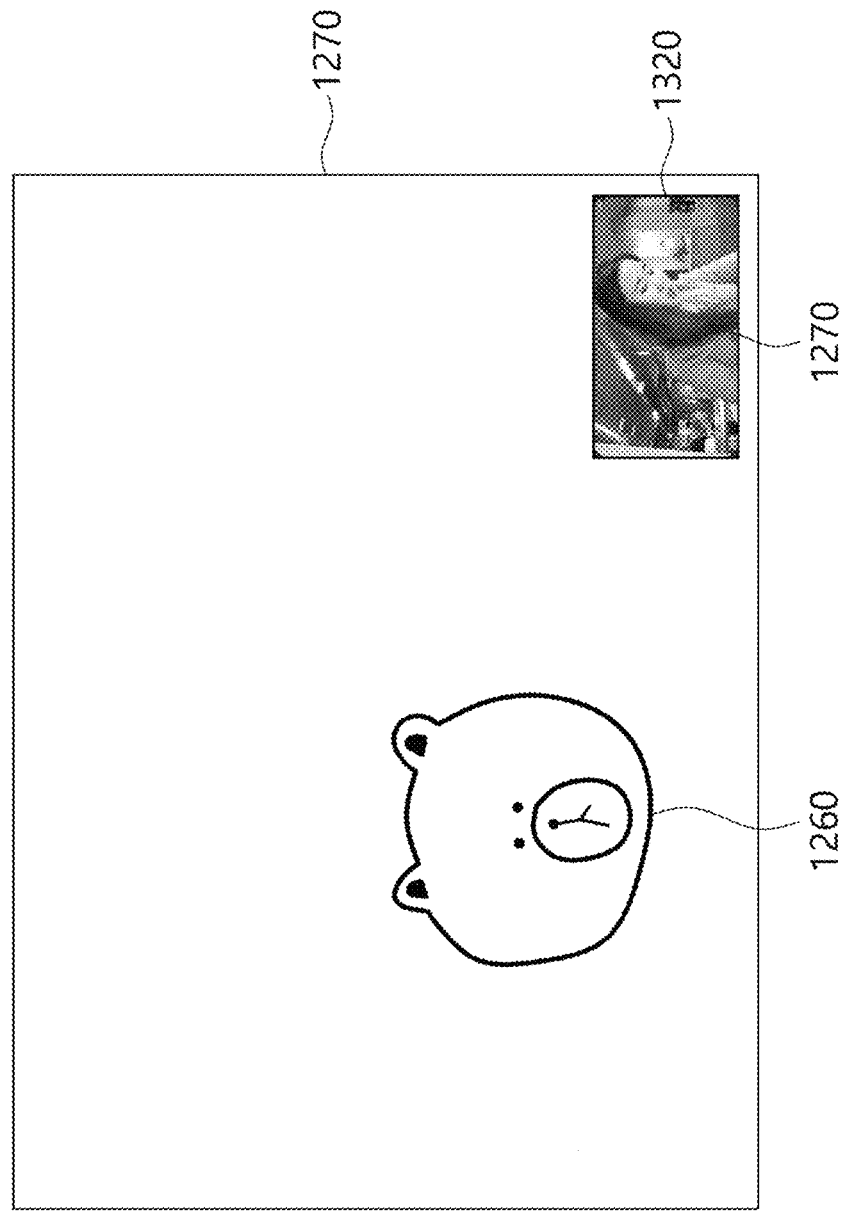
Figure 16:
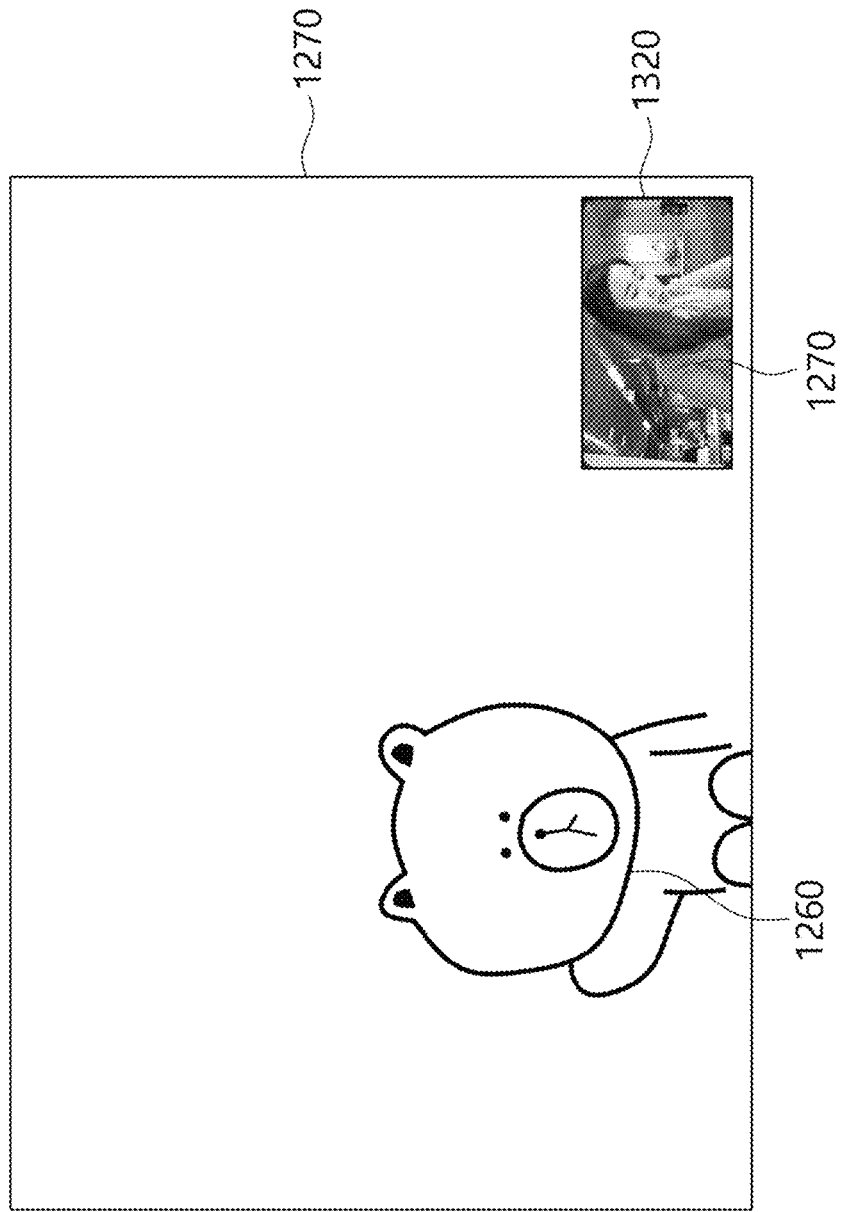
Figure 17:
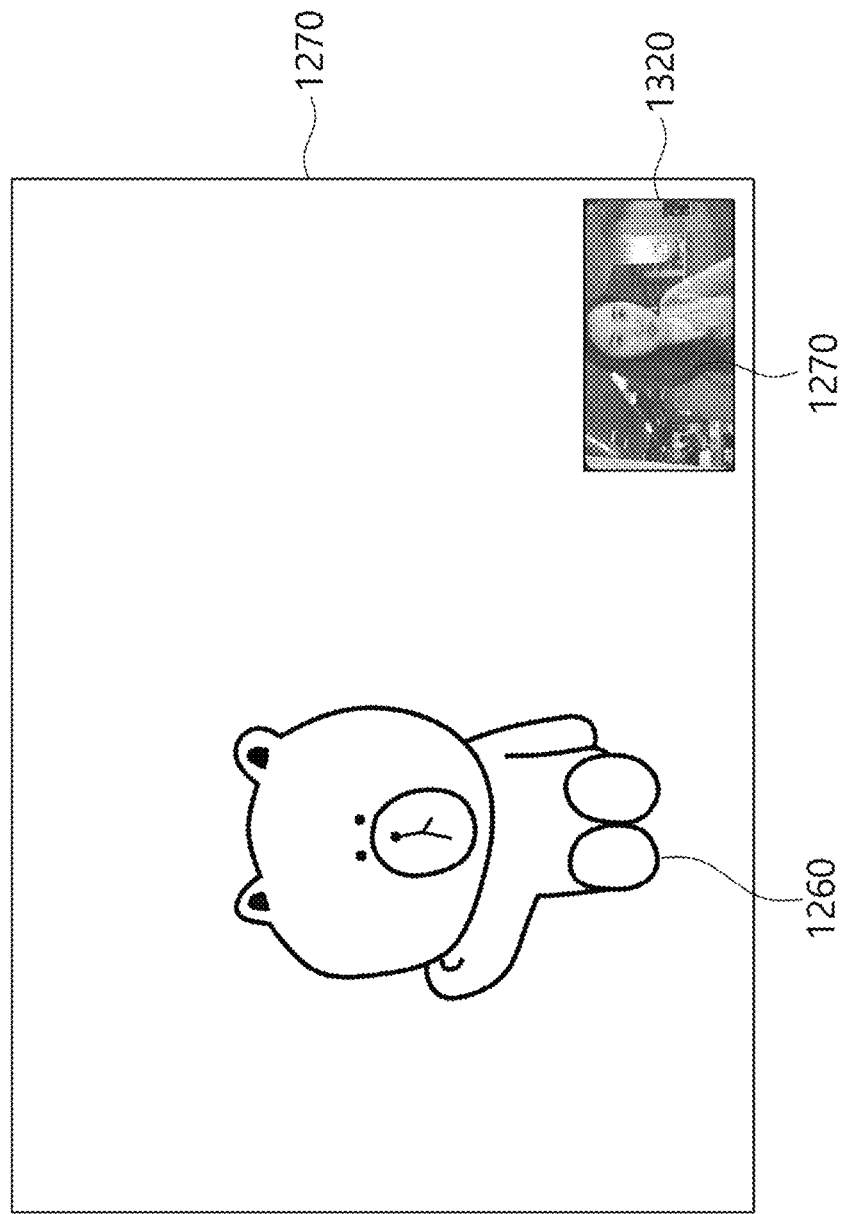

Referring to FIGS. 15 and 17, it can be seen that in the figure formed like a bear on the display, the position of the head of the bear is changed from a lower part of the display to an upper part of the display.

This is because the blank medium image 1210 provided by the data recording application 5000 does not display the whole surface of the blank medium 1200 where a handwriting trajectory is currently being created but enlarges and displays only a partial region.

Accordingly, when the handwriting trajectory created on the blank medium 1200 deviates from a certain region and moves to another region, the data recording application 5000 may shift the blank medium image 1210 in the first window where the handwriting information is reproduced on the basis of the pen data to correspond to the other region of the blank medium 1200.

In detail, when the medium is divided into a first region and a second region distinct from the first region, pen data generated in each region may have different position information for a handwriting trajectory of the corresponding region.

The electronic device 3000 reads a region where the handwriting trajectory is created on the basis of the pen data including the position information of the medium and may automatically shift a region of the electronic device 3000 where the handwriting information is reproduced according to the handwriting trajectory created on the medium.

Also, a user may change, enlarge, or reduce the region of the blank medium image 1210 by touching and dragging the display.

If a user creates a handwriting trajectory while the entire surface of the blank medium 1200 is displayed instead of using the enlarged display screen, a blank medium image 1210 indicating the entire surface may be output to the display. In this case, even though the blank medium image 1210 is not shifted for each region of the blank medium 1200 on the display, the entire handwriting trajectory created on the entire surface of the blank medium 1200 may be reproduced.

When the creation of contents including the handwriting information, the image information, and the audio information is completed, the user ends the recording again, and thus information reduced, replayed, or recorded so far may be stored in the memory module 3400 of the electronic device 3000.

Figure 18:
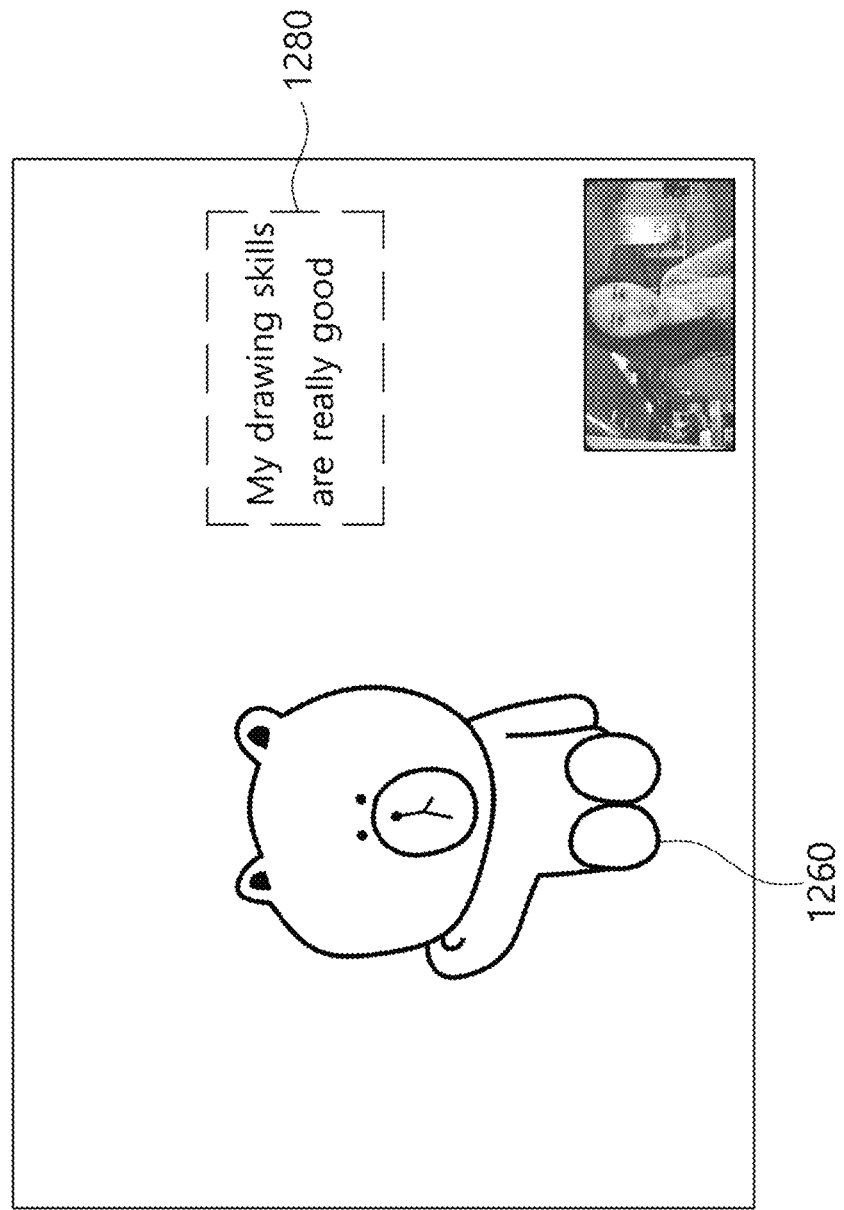
FIGS. 18 and 19 are screens in which additional handwriting information is reproduced according to another embodiment of the present invention.
Figure 19:
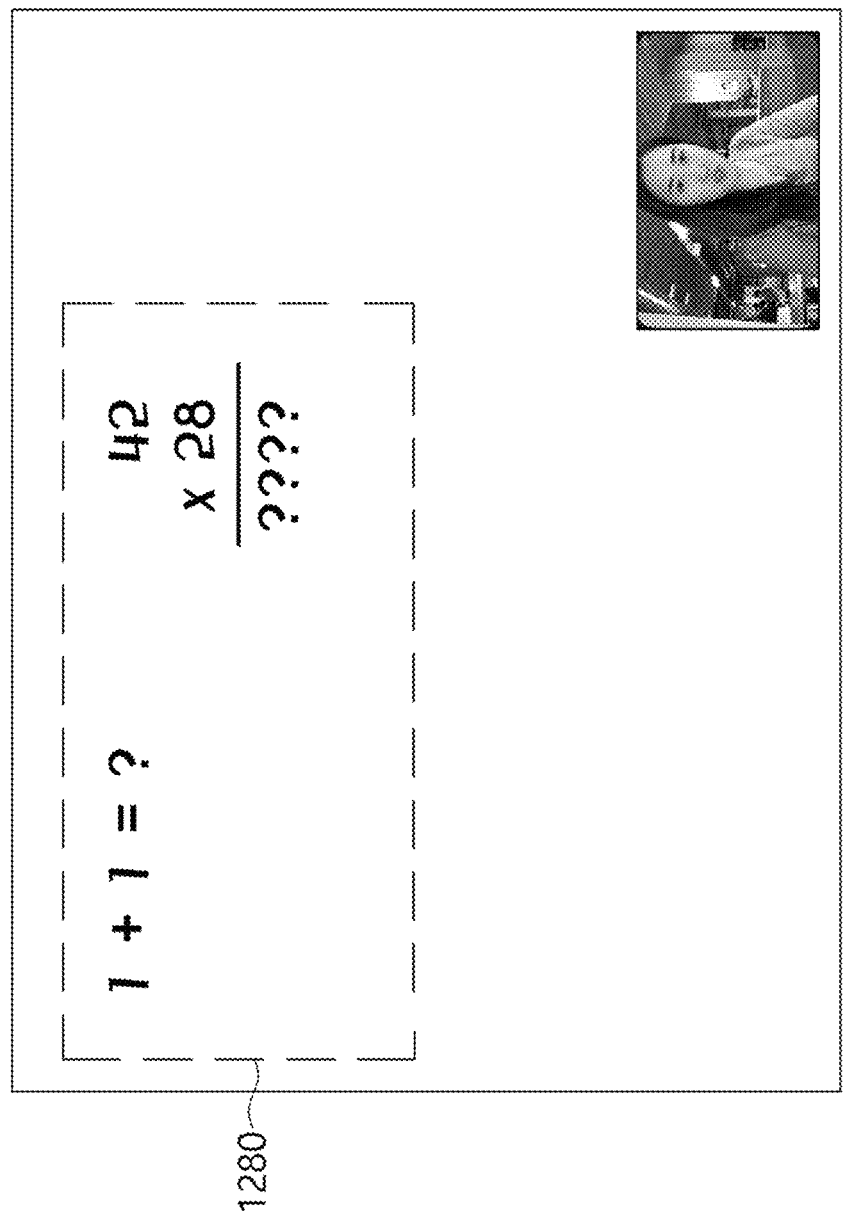

FIGS. 18 and 19 show screens in which additional handwriting information is reproduced according to another embodiment of the present invention.

Referring to FIGS. 18 and 19, a user may enter new handwriting information while all handwriting information that has already been stored is held in the blank medium image. The contents reproduced and stored in the data recording application 5000 may be a video file (including audio) that is recorded over time. Therefore, it is not possible to newly enter handwriting information into contents which is already stored as a video. A technique of creating new letters on a video through video editing is a separate issue.

Therefore, when contents having not yet been completed is stored, it is not easy to produce the contents in addition to handwriting information reproduced and recorded before the storage.

In the case of such a situation, the data recording application 5000 may generate a separate file keeping only the handwritten note even when any one kind of contents, including image information and voice information, is stored in the form of a multi-media file.

When the handwriting information included in the already stored contents are defined as first handwriting information and the image or audio information included in the already stored contents are defined as first image or audio information, a user may output a file again having first handwriting information 1260 only stored therein to electronic device and may reproduce second handwriting information 1280. In this case, as the second handwriting information, a new medium may be used or a medium that is previously used to produce the first handwriting information may be reused. In this case, pen data corresponding to the second handwriting information may be defined as second pen data.

Therefore, a user may produce different contents each time through the data recording application 5000 but may also create updated contents to which handwriting information is added on the basis of the previously created contents. When the contents are updated, the first image or audio information included in the previously created contents are not included in the updated contents because the creation of the contents are made on the basis of time.

The data recording application 5000 may recognize the information included in the contents. The data recording application 5000 may recognize the handwriting information, image information, and audio information included in the contents and may automatically generate one or more pieces of tag information included in the corresponding contents when the contents are stored in the electronic device 3000.

For example, the data recording application 5000 may include a text recognition function and an audio recognition function. When the contents are stored, the data recording application 5000 may recognize the handwriting information and the audio information included in the stored contents, extract the most frequently used words, and attach the tag information to the contents.

Only one tag may be generated, but a plurality of tags may also be generated.

A tag generated for the contents may be used to classify, sort, or find the contents by type in addition to the title of the contents.

Figure 20:
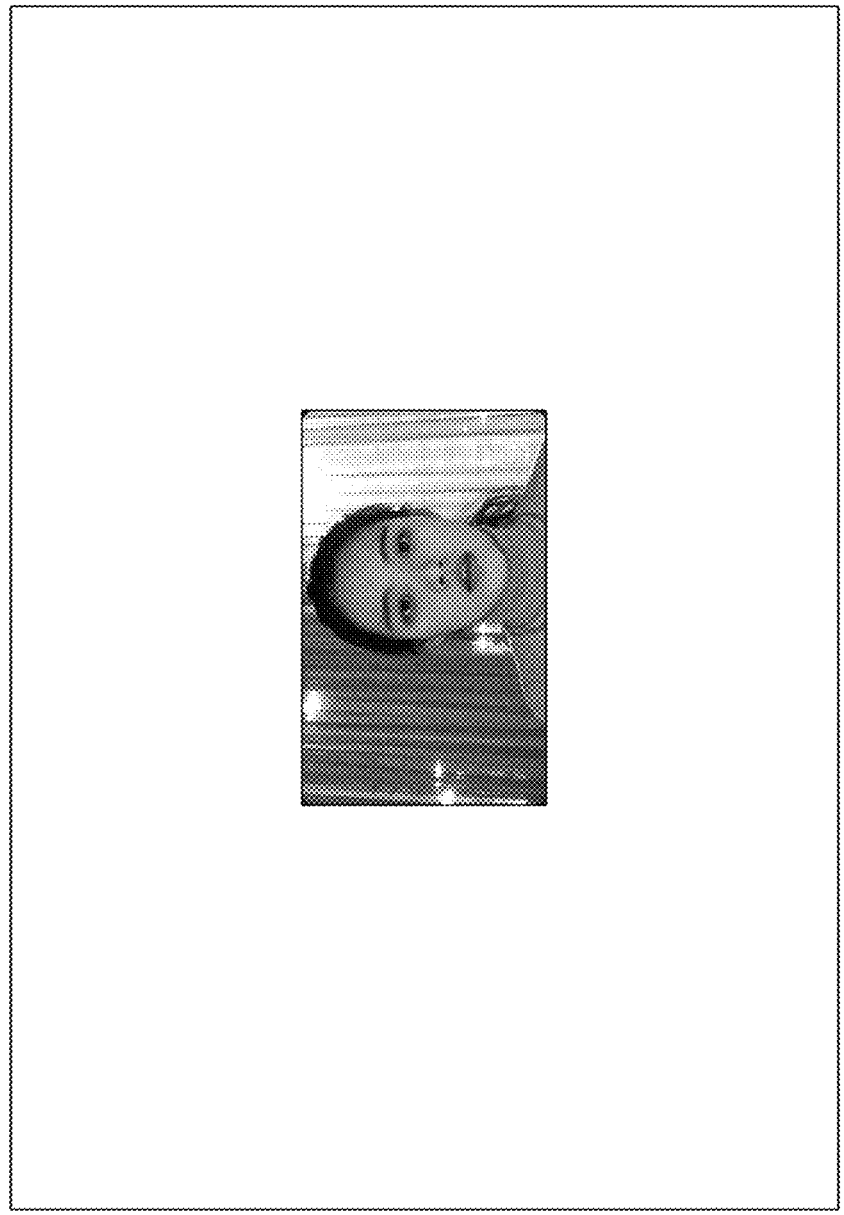
FIG. 20 is a screen in which contents are produced on the data recording application according to still another embodiment of the present invention.

FIG. 20 is a screen in which contents are produced on the data recording application according to still another embodiment of the present invention.

Referring to FIG. 20, a user may produce contents using a tool capable of adding an aesthetic sense to the handwriting information when the handwriting information for the data recording application 5000 is reproduced. In this case, when stroke data which is based on the handwriting information is expressed as the handwriting information, the color, thickness, and the like of each stroke may be changed to reproduce the handwriting information to which an aesthetic sense is added.

The color and thickness of the handwriting information, in detail, the color and thickness of strokes constituting the handwriting information, may be reproduced by event information of a menu selected from the menu medium 1500 being reproduced in the electronic device 3000.

Figure 21:
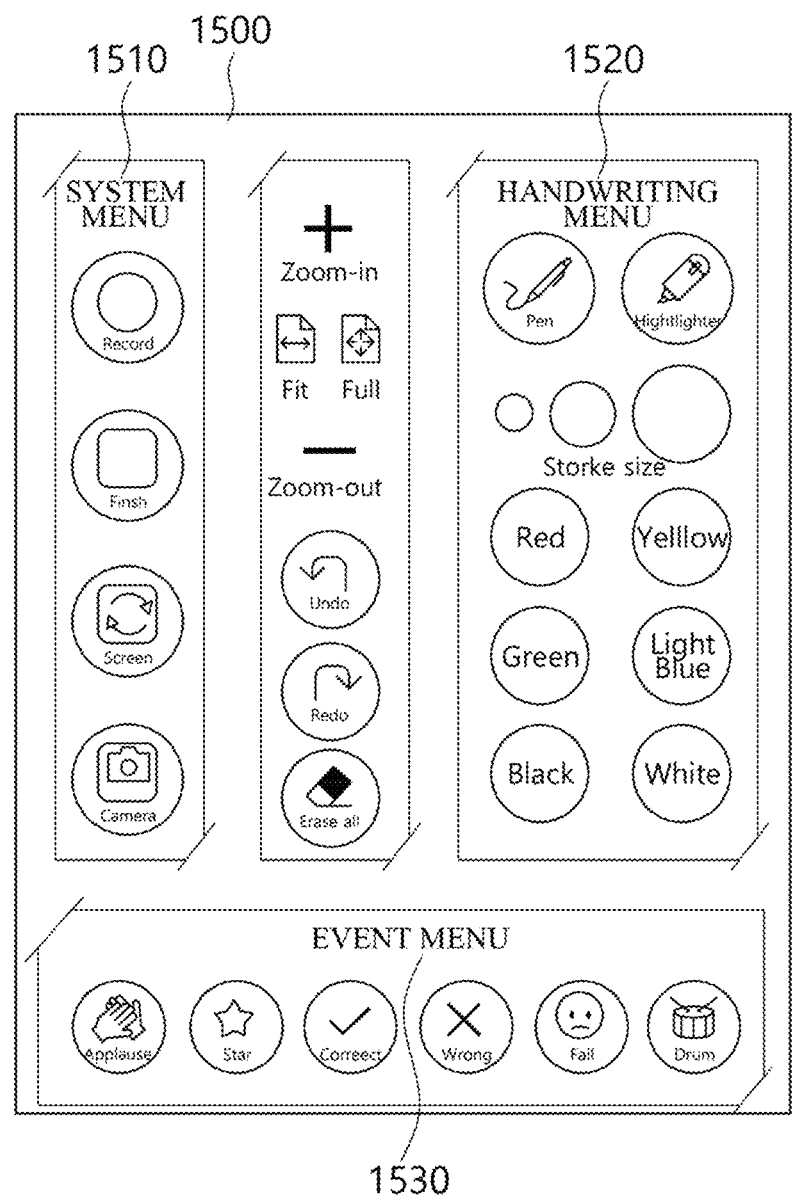
FIG. 21 is a diagram showing a menu medium according to embodiments of the present invention.
Figure 22:
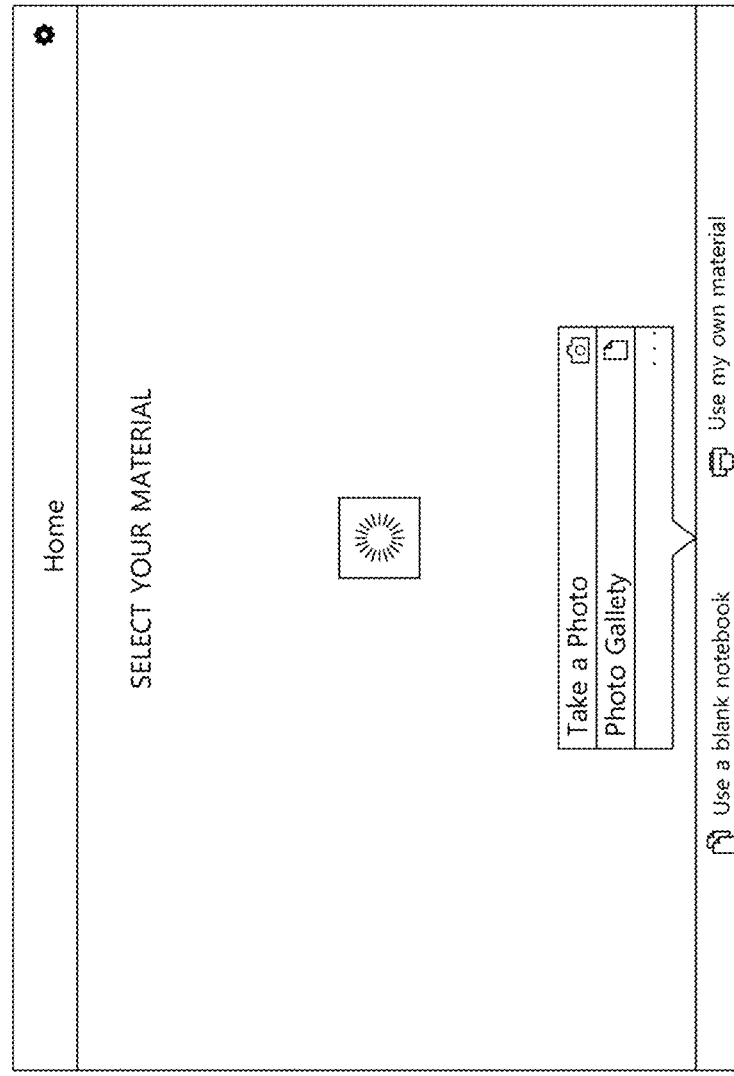

FIG. 21 is a diagram showing a menu medium according to embodiments of the present invention.

Referring to FIG. 21, the menu medium 1500 may largely include a system menu 1510, a handwriting menu 1520, and an event menu 1530. It is assumed that a necessary function is performed while the data recording application 5000 is driven. In this case, when a specific menu included in the menu medium 1500 is selected with the electronic pen 2000, the effect of the selected menu may be delivered to the output module 3200 of the electronic device 3000 and may be performed on the display.

The menu medium 1500 may be made of a specific material, such as paper, plastic, and metal, where a pattern code is printed, like the above-described medium. However, the menu medium 1500 may be coded in the data recording application 5000 and implemented in the electronic device 3000. When the menu medium 1500 is coded in the data recording application 5000 and implemented in the electronic device 3000, a user may select a specific menu from the display of the electronic device 3000 when creating contents. When the menu medium 1500 includes a recording medium such as paper, other than the electronic device 3000, a user may select a menu included in the menu medium 1500 using the electronic pen 2000, and thus the effect of the menu may be achieved in the display.

The menu medium 1500 may include a pattern code that may be detected for each menu by the electronic pen 2000. In this case, a method of the electronic pen 2000 detecting a menu included in the menu medium 1500 is the same as a method of the electronic pen 2000 recognizing a pattern code on the medium in order to generate pen data (handwriting information implemented on the display of the electronic device), and thus a detailed description thereof will be omitted.

The communication module of the electronic device 3000 may receive that the menu included in the menu medium 1500 is selected with the electronic pen 2000. Each menu included in the menu medium 1500 being selected by the electronic pen 2000 may be defined as an event. The event may be output by a display or a speaker, which is the output module 3200.

Sub-menus included in the menu medium 1500 will be described in detail below. In this embodiment of the present invention, each menu is named in order to describe the menus, but the menus may be named differently from the names described herein.

The system menu may provide functions for starting and ending recording, configuring a screen, editing information, and the like when the data recording application 5000 is driven. The system menu may include a "record" menu, a "finish" menu, a "screen" menu, a "camera" menu, a "zoom-in" menu, a "zoom-out" menu, a "fit" menu, a "full" menu, an "undo" menu, a "redo" menu, or an "erase all" menu.

The "record" menu may allow contents including handwriting information, image information, and voice information to start to be stored.

The "finish" menu may allow contents to be stopped from being produced and then to be stored when the production of the contents are completed.

When it is assumed that there are a display (a first window) for displaying handwriting information and a display (a second window) for displaying a user' image information, the "screen" menu may allow a display state in which both of the first window and the second window are displayed to change to a display state in which only the second window is displayed or a reverse display state.

The "camera" menu may allow the display (the second window) for displaying the user's image information to be turned on or off.

The "zoom-in" menu may allow the handwriting information to look bigger by enlarging and zooming in on the medium image, which is a region for displaying the handwriting information, on the display.

The "zoom-out" menu may allow the handwriting information to look smaller by reducing or zooming out on the medium image, which is a region for displaying the handwriting information, on the display.

The "fit" menu may allow the medium image to be enlarged in the width direction.

The "full" menu may allow the entirety of the medium image to be displayed on the display. When the medium includes a plurality of sub-media, the entirety of a region of a sub-medium being created by a user may be displayed.

The "undo" menu may allow the previous reproduction of handwriting information to be deleted.

The "redo" menu may allow the previously deleted handwriting information to be reproduced again.

The "erase all" menu may allow all handwriting information reproduced on the display to be deleted.

The system menu may include a "pause" menu (not shown). The "pause" menu may provide an editing function of modifying or deleting handwriting information reproduced before a pause or adding additional handwriting information by stopping the capture of image information or audio information of a user and then activating only the display (the first window) to reproduce handwriting information during the reproduction of the contents.

The creation of contents may be done over time. The modification and editing of contents may be performed using functions, such as "undo," "redo," and "erase all," of the menu medium and is also a process that progresses over time.

Therefore, when it is necessary to take time to correct handwriting information during contents production, when it is necessary to execute another multimedia file in the data recording application without interruption of time, or when it is necessary to perform another task on the electronic device, the "pause" menu may be used to facilitate the editing of the contents or to continuously produce the contents.

A handwriting menu may provide a visual effect to handwriting information reproduced on the display of the electronic device 3000 when a user creates the handwriting information on the medium. The handwriting menu may include a "pen" menu, a "highlighter" menu, a "stroke size" menu, or a "color" menu (red, yellow, green, light blue, black, white). The menus included in the handwriting menu may change the color or thickness of strokes included in handwriting information.

The "pen" menu may indicate a value that is initially set to be displayed on the display of the electronic device 3000 when handwriting information is input to the medium with the electronic pen 2000 and typically may allow letters or pictures to be reproduced with thin lines.

The "highlighter" menu may allow a specific region on the medium to be highlighted or allow letters or pictures to be reproduced with thick lines. The "highlighter" menu may allow the thickness of the lines to vary when the letters or pictures are reproduced by a user selecting a "stroke size" menu. A stroke size that may be selected from the "highlighter" menu may be greater than a stroke size that is applied when the "pen" menu is selected.

The "color" menu (red, yellow, green, light blue, black, white) may allow the color of letters or pictures to be changed when handwriting information is reproduced on the display. The "color" menu may be applied to both of the "pen" menu and the "highlighter" menu.

An event selected as a menu from an event menu may allow a visual effect or a sound effect to be provided through an output module of the electronic device 3000.

The event menu may include an "applause" menu, which is for generating a sound effect," a "star" menu, a "correct" menu, a "wrong" menu, a "fail" menu, a "drum" menu, and the like. For example, when handwriting information is reproduced in the display and the "applause" menu is selected with the electronic pen 2000, an applause sound pre-stored in the memory module 3400 of the electronic device 3000 may be output through a speaker of the electronic device 3000.

The event menu may include a "mask" menu in order to generate an image effect. The default settings of the data recording application 5000 indicate a user's image information and voice information and the reproduction of handwriting information created on the medium. When the "mask" menu is selected to prevent the face of a user from appearing in the contents, the face of the user may be masked. It will be appreciated that the data recording application 5000 may turn off the image information through the menu medium 1500 in order to block the image information of the user from being displayed on the display. However, this fundamentally blocks the capturing of the user and thus is not appropriate when the user wants to block only his or her face.

A method of a user creating contents on the graphic medium 1400 by selecting a document file stored in the electronic device 3000 will be described below. The above description of the blank medium 1200 may be applied to the graphic medium 1400 as it is.

FIGS. 22 to 26 are screens illustrating the progress of the data recording application after selecting a graphic medium.

Referring to FIGS. 7 and 22 to 26, a user may perform a step of selecting the graphic medium 1400 from the data recording application 5000.

In order to generate the graphic medium 1400, the user directly takes a photo through the data recording application 5000 to generate a file or may select a document file which is pre-stored in the memory module 3400 of the electronic device 3000 and which includes pictures or letters.

Figure 23:
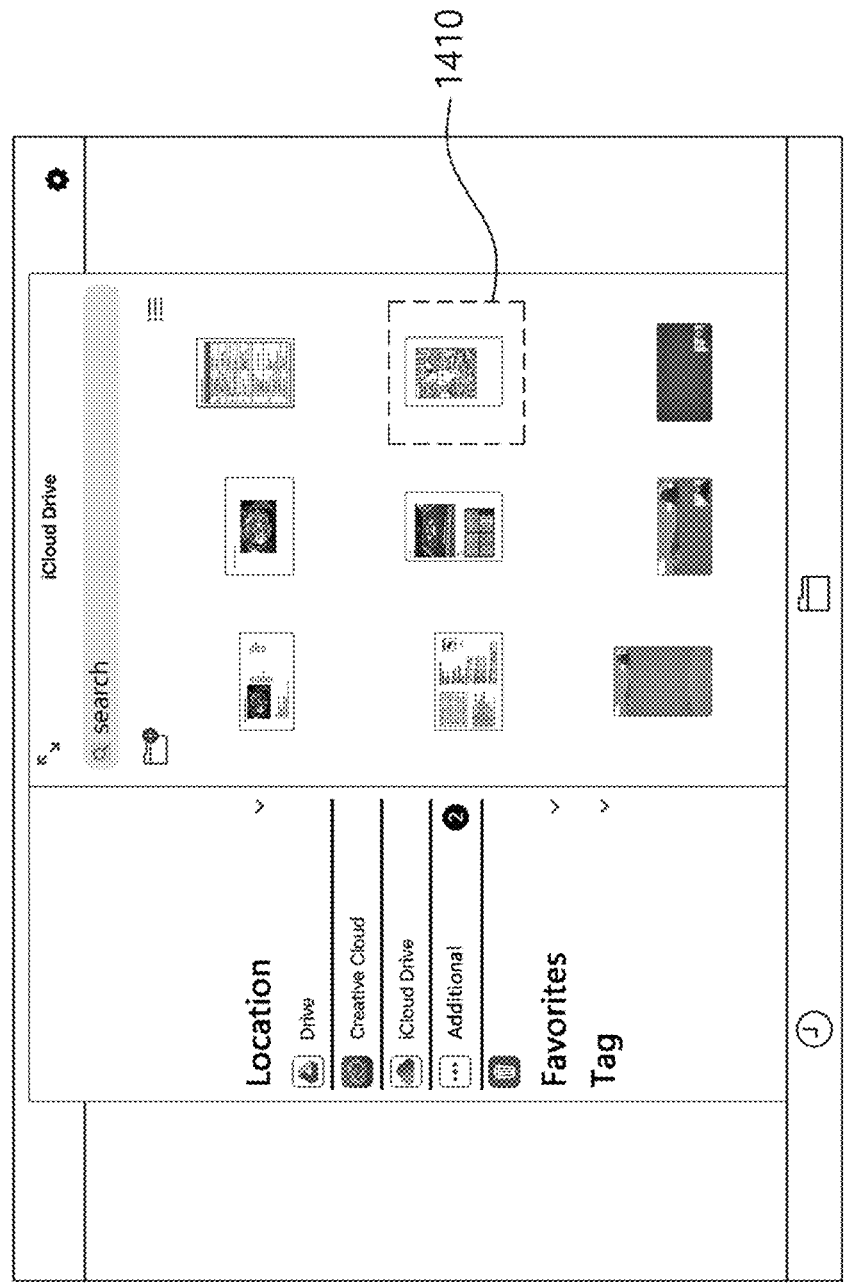

When document files stored in the electronic device 3000 are loaded and a file 1410 to be used as the graphic medium 1400 is selected, the data recording application 5000 converts the corresponding file into a graphic medium image 1420 which has a form usable by the data recording application 5000 as shown in FIG. 23. The graphic medium image 1420 may be generated as a graphic medium file and may be output to the graphic medium 1400 through an output module connected to the electronic device 3000, for example, a printer. FIG. 25 shows an aspect in which the graphic medium file is actually output.

When a file stored in the electronic device 3000 includes a plurality of sheets, the graphic medium image 1420 may also include a plurality of sheets. When a graphic medium file including the graphic medium image 1420 including a plurality of sheets is output to the graphic medium 1400, the graphic medium 1400 may also include a plurality of sub-media.

Also, the graphic medium file may be transmitted by e-mail or through other transmission media by using a sharing function and may be output to the graphic medium through yet another output module connected to the electronic device that has received the graphic medium file.

Figure 24:
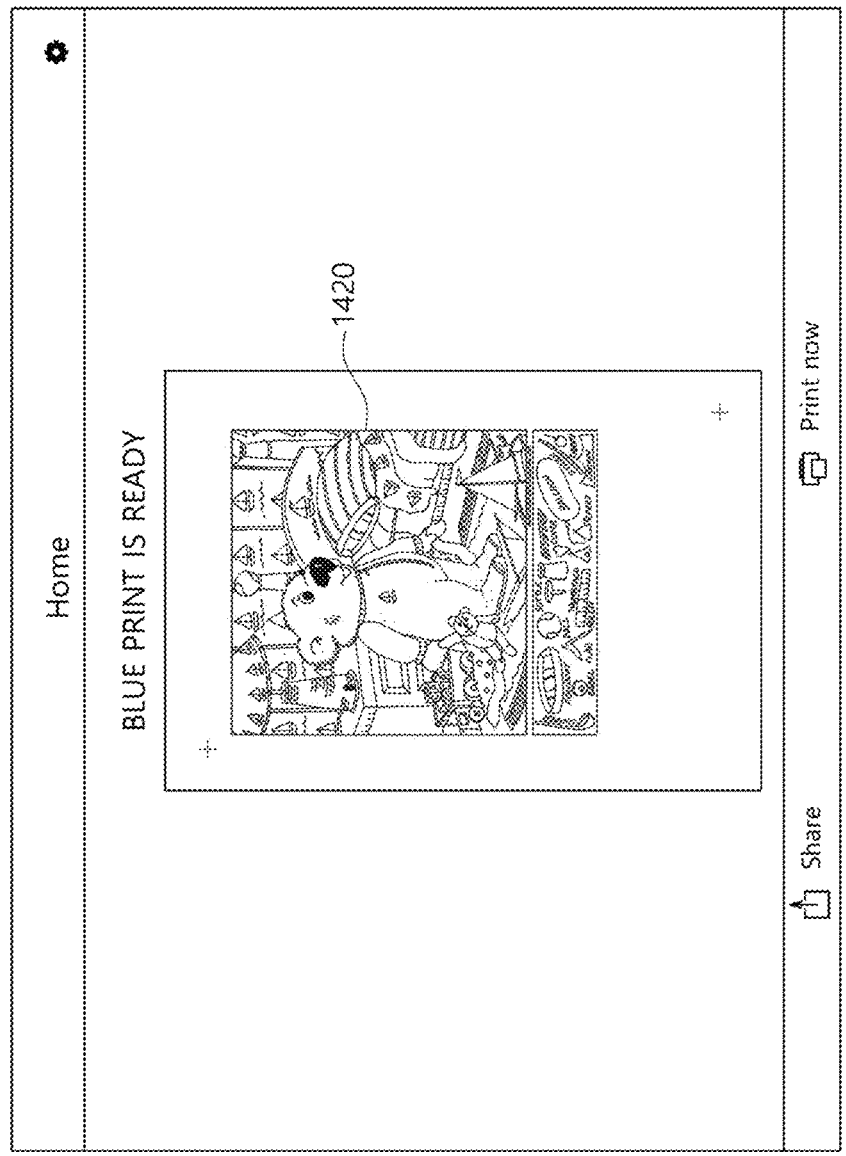
Figure 26:
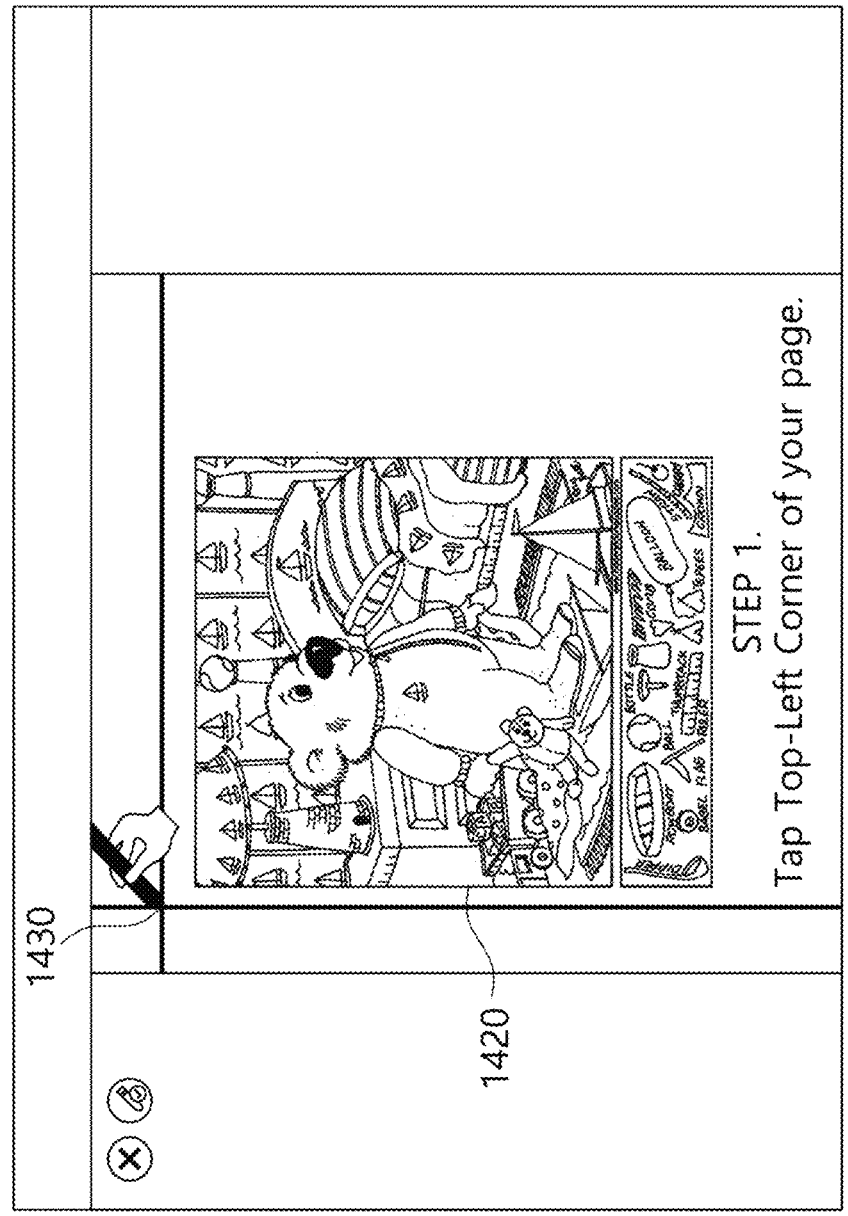

When the graphic medium file is output to the graphic medium 1400, the graphic medium file may be printed on a blank medium 1200 having a pattern code formed therein. When a file for the graphic medium 1400 should be printed on a medium having no pattern code, the data recording application should also add a pattern code to the graphic medium file. In this case, graphics in the file for the graphic medium 1400 and the pattern code should be printed together, and thus the speed of the output is decreased. However, according to an embodiment of the present invention, by printing a graphic medium file on the blank medium 1200 on which the pattern code has already been printed, it is possible to improve the speed of the output compared to the case in which the graphics in the file for the graphic medium 1400 and the pattern code are printed together on a medium having no pattern code. When printing a print containing a pattern code with a color printer, the object to be printed excluding the pattern code should be printed in a color other than black. This is because the electronic pen can detect a pattern code by emitting infrared light to the medium and recognizing an unreflective region using an infrared sensor. When the pattern code is printed on the medium together with the graphic medium file if the graphic medium file may include an object represented in black, the object is printed with a black print material containing carbon during the printing on the medium, and thus it may be difficult to recognize the pattern code. In order to overcome the limit, the file for the graphic medium 1400 is changed to a specific series color (for example, a blue series color) as shown in FIG. 25, and the changed graphic medium file is printed on the blank medium 1200 where a pattern code has already been printed. However, the graphic medium is represented in the changed color only upon printing, and the image of the graphic medium is represented in the original color in the data recording application 5000. It is noted that the drawings of FIGS. 24 and 26 are shown in blue in the drawings of Korean patent application 10-2017-0182503, which is the basis of the Paris Convention for this PCT application. Although the drawings of this PCT application are drawn in black and white due to the drawing regulations for PCT applications, the drawings in FIGS. 24 and 26 should be drawn in a color other than black.

Referring to FIG. 26, the graphic medium image 1420 may be output to the display of the electronic device 3000 and then may undergo a calibration process. A user taps a cross mark 1430, which is a marker displayed at an upper end and a lower end of the output graphic medium 1400, with the electronic pen 2000, to perform calibration between the graphic medium 1400 and the image of the graphic medium 1400 output to the display screen of the electronic device 3000. When the graphic medium 1400 includes a plurality of sub-media, the calibration process may be performed on each sub-medium. In this embodiment of the present invention, a process of performing calibration is described as being executed by tapping a cross mark displayed on the graphic medium 1400 with the electronic pen 2000. However, the present invention is not limited thereto, and the calibration process may be performed in various ways.

Figure 27:
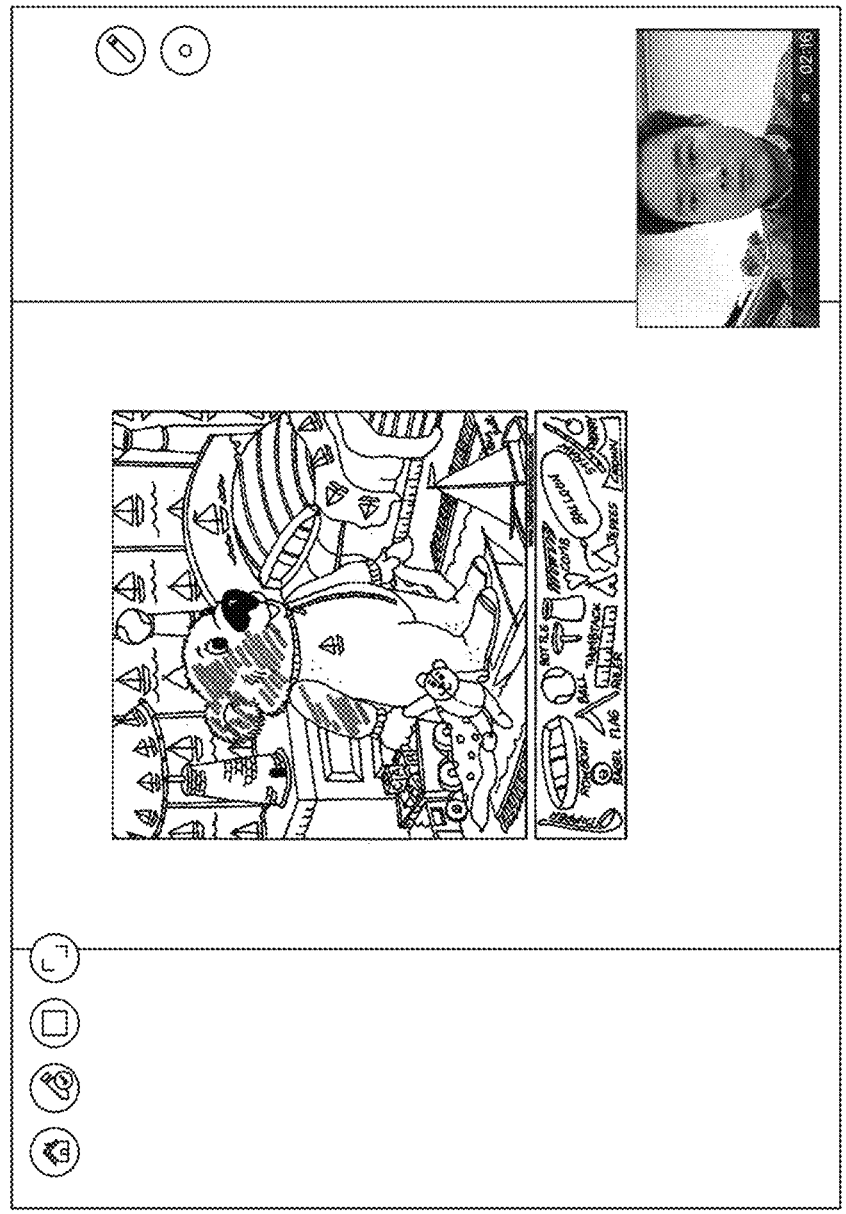
FIG. 27 is a diagram showing an aspect in which contents are reproduced on the graphic medium image according to embodiments of the present invention.
Figure 28:
FIG. 28 is a diagram showing a handwriting trajectory created on the graphic medium according to embodiments of the present invention.

FIGS. 27 and 28 are diagrams showing an aspect of producing contents on the graphic medium according to embodiments of the present invention. FIG. 27 shows an aspect in which contents are reproduced on the electronic device, and FIG. 28 shows a handwriting trajectory created on the graphic medium.

Referring to FIGS. 27 and 28, when a graphic medium image is output to the display of the electronic device 3000, a user may create contents while writing pictures or letters on the printed graphic medium 1400. The contents created on the graphic medium 1400 may be reproduced on the display of the electronic device 3000.

Since ink embedded in the electronic pen 2000 is black, the handwriting trajectory displayed on the graphic medium 1400 appears only in black. However, when a desired color or a desired stroke size is selected from the handwriting menu set in the menu medium 1500 using the electronic pen 2000 during the creation of contents, an event of the selected menu may occur, and strokes having changed color and size may be reproduced on the display.

It is assumed that the tip part of the electronic pen 2000 has various inks. When the electronic pen 2000 writes in different colors on the graphic medium 1400 or the blank medium 1200, pen data to be converted into data in the electronic pen 2000 may include color information. When the pen data is received by the electronic device 3000, the handwriting information may be reproduced on the display according to the color information included in the pen data after the pen data is interpreted. Accordingly, in this case, even when there is no menu medium 1500, the color of the handwriting information may be reproduced on the display.

Figure 29:
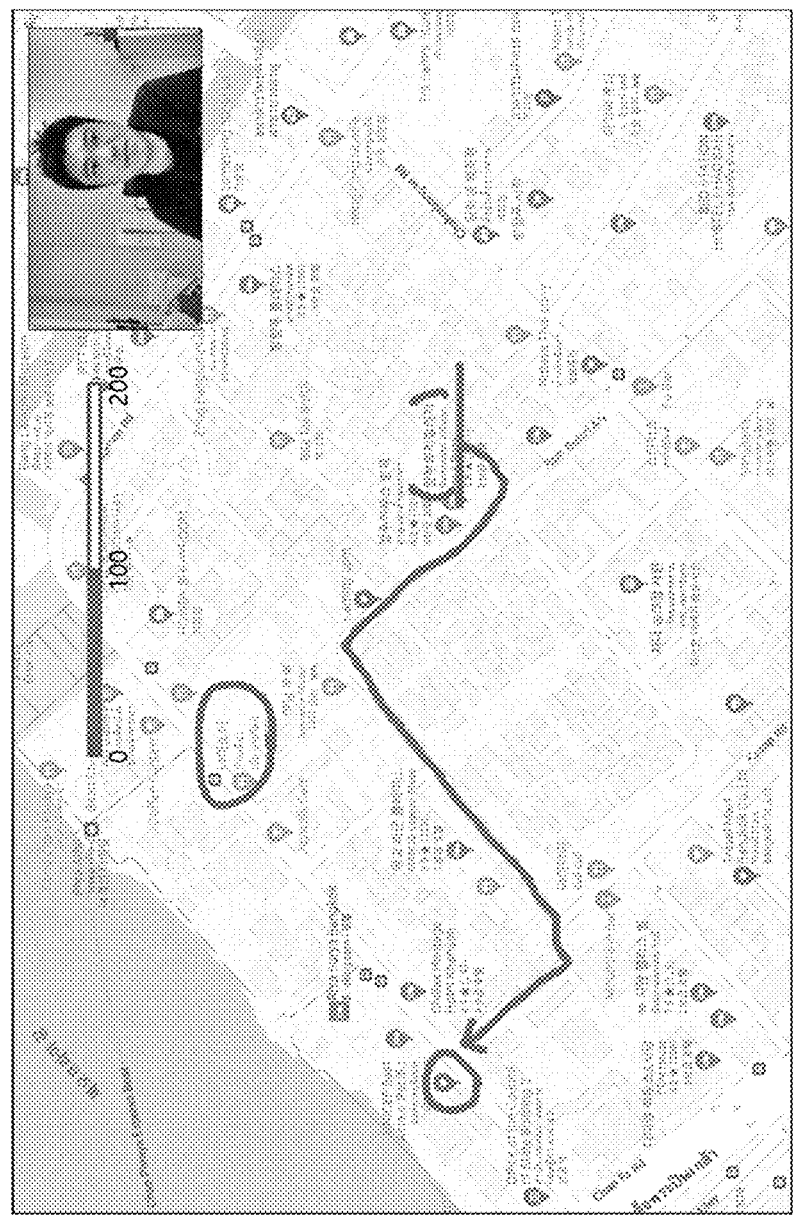
FIG. 29 is a diagram in which contents are created on the graphic medium according to embodiments of the present invention.

FIG. 29 is a diagram in which contents are created on the graphic medium according to embodiments of the present invention.

Referring to FIG. 29, a user outputs a map showing a region of Thailand on a display as an image for the graphic medium 1400 and then explains the corresponding region. Parentheses, circles, and bent straight lines shown on the drawing represent that a handwriting trajectory drawn by the user with the electronic pen 2000 on the image for the graphic medium 1400 is reproduced on the image for the graphic medium 1400 output to the display.

Figure 30:
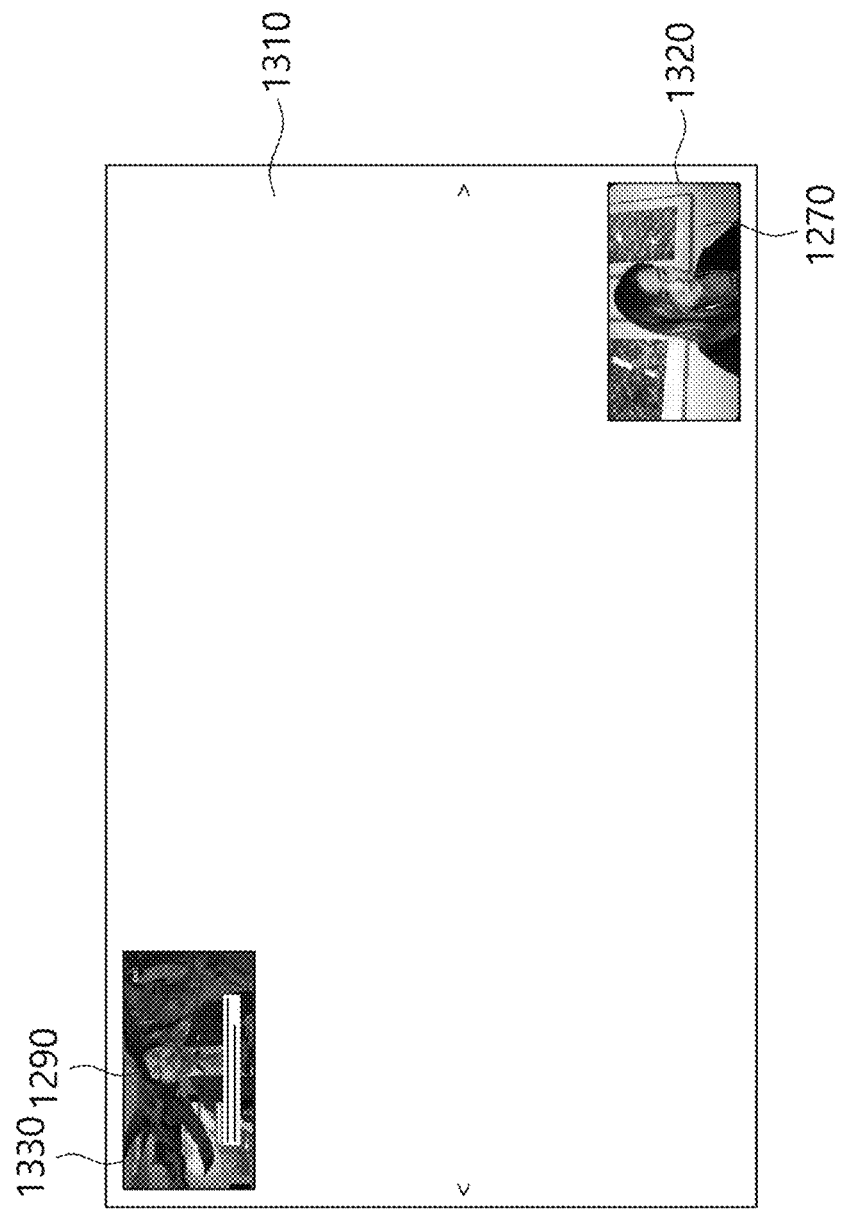
FIG. 30 is a diagram showing an aspect in which contents are produced according to another embodiment of the present invention.

FIG. 30 is a diagram showing an aspect in which contents are produced according to another embodiment of the present invention.

Referring to FIG. 30, the data recording application 5000 may further include other image information or audio information contained in the electronic device 3000.

When using the data recording application 5000, a user may produce contents by executing, in the electronic device 3000, all of an image file, an audio file, or a file having an image and audio recorded together (which may be referred to as a multimedia file) which are stored in the electronic device 3000.

Alternatively, a user may enter a web address to the data recording application 5000 and execute a multimedia file loaded from a website to produce contents.

In FIG. 30, a female in a screen shown at a lower portion indicates a user who creates contents, and the user screen may be defined as first image information 1270 or first audio information. A screen shown in an upper left portion may be defined as second image information 1290 or second audio information that indicates a video (including image and audio information) contained in the electronic device 3000.

A region of the display of the electronic device 3000 where the handwriting information 1260 is reproduced may be referred to as a first window 1310, and another region where a user's appearance is displayed may be referred to as a second window 1320. Also, a region where the second image information 1290 is displayed may be referred to as a third window 1330. The first window 1310 may be wider than the second window 1320 or the third window 1330 to encompass the region of the second window 1320 or the third window 1330. In the first window, the position of the second window or the third window may be adjusted by a user touching and dragging.

The present invention, which has been described above, can be variously substituted, modified, and changed by those skilled in the art without departing from the technical spirit of the present invention and thus is not limited by the above embodiments and the accompanying drawings. Also, the embodiments described herein are not restrictively applicable, but all or some of the embodiments may be selectively combined and configured to achieve various modifications. Furthermore, the steps of each embodiment may be used separately from or in combination with steps of another embodiment.

MODE FOR CARRYING OUT THE INVENTION

As described above, related matters have been described in the best mode for carrying out the invention.

The invention claimed is:

1. An electronic device for reproducing a first pen data obtained by digitizing a handwriting trajectory created on a medium with an electronic pen, the electronic device comprising:
   a memory module configured to store a contents including a first handwriting information obtained by converting the first pen data and first video information captured by a camera built in the electronic device;
   an output module; and
   a control module, wherein the control module is configured to:
      reproduce the first handwriting information on a first window of the output module and the first video information on a second window of the output module, wherein the first window of the output module is configured to represent an image corresponding to the medium, and wherein a position of the second window in the output module is adjustable,
      based on a second pen data received from the electronic pen while the first video information is being captured by the camera, add a second handwriting information obtained by converting the second pen data to the contents so that the second handwriting information is reproduced on the first window of the output module in time sequence, and
      based on third pen data received from the electronic pen while a capture of the first video information is stopped by a pause event, add a third handwriting information obtained by converting the third pen data to the contents so that the third handwriting information is displayed on an area included in the first window of the output module excluding the second window of the output module, wherein the first window of the output module is activated,
   wherein:
      a region where at least one of the first handwriting information, the second handwriting information, or the third handwriting information are reproduced is automatically shifted in the first window according to the handwriting trajectory created on the medium based on position information included in at least one of the first pen data, the second pen data, or the third pen data;
      the second window of the output module is positioned in at least a partial region of the first window; and
      the first handwriting information, the second handwriting information and the third handwriting information are configured to not be reproduced on the partial region in which the second window of the output module is positioned.

2. The electronic device of claim 1, wherein the contents further include an event information of a menu selected from a menu medium.

3. The electronic device of claim 2, wherein the menu medium includes a pause menu, a system menu, a handwriting menu, and an event menu.

4. The electronic device of claim 3, wherein the pause event occurs when the pause menu is selected.

5. The electronic device of claim 3, wherein the control module is further configured to:
   based on receiving a selection of one of a plurality of menus included in the event menu, provide a visual effect or a sound effect through the output module.

6. The electronic device of claim 3, wherein the control module is further configured to:
   based on receiving a selection of one of a plurality of menus included in the handwriting menu, change a color or thickness of a stroke included in the first handwriting information or the second handwriting information when the first pen data or the second pen data is converted into the first handwriting information or the second handwriting information, respectively.

7. The electronic device of claim 2, wherein the menu medium includes a plurality of menus, and each of the plurality of menus has a pattern code to be detected by the electronic pen, and when the control module receives a selection of one of the plurality of menus included in the menu medium, an event of the selected menu is reproduced on the output module.

8. The electronic device of claim 1, wherein the contents further include second video information stored in the memory module of the electronic device.

9. The electronic device of claim 8, wherein the output module includes a third window of the output module for displaying the second video information.

* * * * *